United States Patent
Aguayo Gonzalez et al.

(10) Patent No.: US 10,157,278 B2
(45) Date of Patent: Dec. 18, 2018

(54) SYSTEMS, METHODS, AND APPARATUSES FOR INTRUSION DETECTION AND ANALYTICS USING POWER CHARACTERISTICS SUCH AS SIDE-CHANNEL INFORMATION COLLECTION

(71) Applicant: Power Fingerprinting Inc., Vienna, VA (US)

(72) Inventors: Carlos R. Aguayo Gonzalez, Reston, VA (US); Jeffrey H. Reed, Blacksburg, VA (US); Steven C. Chen, Potomac, MD (US)

(73) Assignee: Power Fingerprinting Inc., Vienna, VA (US)

( * ) Notice: Subject to any disclaimer, the term of this patent is extended or adjusted under 35 U.S.C. 154(b) by 353 days.

(21) Appl. No.: 15/167,772

(22) Filed: May 27, 2016

(65) Prior Publication Data

US 2016/0342791 A1    Nov. 24, 2016

Related U.S. Application Data

(60) Continuation of application No. 14/881,862, filed on Oct. 13, 2015, now Pat. No. 9,411,009, which is a
(Continued)

(51) Int. Cl.
*G06F 21/55* (2013.01)
*G06F 21/75* (2013.01)
(Continued)

(52) U.S. Cl.
CPC .......... *G06F 21/552* (2013.01); *G01R 21/00* (2013.01); *G01R 31/2832* (2013.01);
(Continued)

(58) Field of Classification Search
CPC ...... G06F 21/552; G06F 21/755; G06F 21/32; G06F 2221/034; G01R 31/2893;
(Continued)

(56) References Cited

U.S. PATENT DOCUMENTS 7,515,094 B2    4/2009  Keller, III
7,555,787 B2 *  6/2009  Clercq ................. G06F 9/3017
                                                    380/287
(Continued)

FOREIGN PATENT DOCUMENTS

WO    WO 2010/044069    4/2010
WO    WO 2013/131073    9/2013
WO    WO 2014/144857    9/2014

OTHER PUBLICATIONS

Gonzalez, Carlos R. Aguayo, and Jeffrey H. Reed. "Power fingerprinting in SDR & CR integrity assessment." Military Communications Conference, 2009. MILCOM 2009. IEEE. IEEE, 2009.
(Continued)

*Primary Examiner* — Darren B Schwartz
(74) *Attorney, Agent, or Firm* — Cooley LLP

(57) ABSTRACT

Some embodiments described herein include a system that collects and learns reference side-channel normal activity, process it to reveal key features, compares subsequent collected data and processed data for anomalous behavior, and reports such behavior to a management center where this information is displayed and predefine actions can be executed when anomalous behavior is observed. In some instances, a physical side channel (e.g. and indirect measure of program execution such as power consumption or electromagnetic emissions and other physical signals) can be used to assess the execution status in a processor or digital circuit using an external monitor and detect, with extreme accuracy, when an unauthorized execution has managed to
(Continued)

disrupt the normal operation of a target system (e.g., a computer system, etc.).

20 Claims, 19 Drawing Sheets

Related U.S. Application Data division of application No. 14/720,497, filed on May 22, 2015, now Pat. No. 9,268,938.

(51) Int. Cl.
*G01R 31/28* (2006.01)
*G01R 21/00* (2006.01)
*G06F 21/32* (2013.01)
*G01R 1/04* (2006.01)

(52) U.S. Cl.
CPC ..... *G01R 31/2887* (2013.01); *G01R 31/2891* (2013.01); *G01R 31/2893* (2013.01); *G06F 21/32* (2013.01); *G06F 21/558* (2013.01); *G06F 21/755* (2017.08); *G01R 1/0408* (2013.01); *G01R 31/2886* (2013.01); *G06F 2221/034* (2013.01)

(58) Field of Classification Search
CPC .......................... G01R 21/00; G01R 31/2832; G01R 31/2887; G01R 31/2891; G01R 1/0408; G01R 31/2886
See application file for complete search history.

(56) References Cited

U.S. PATENT DOCUMENTS

| | | | |
|---|---|---|---|
| 7,853,437 B2 | 12/2010 | Seguin et al. | |
| 7,869,977 B2 | 1/2011 | Lewis et al. | |
| 7,877,621 B2 | 1/2011 | Jacoby et al. | |
| 8,069,490 B2 | 11/2011 | Gross et al. | |
| 8,122,498 B1 | 2/2012 | Gordon et al. | |
| 8,242,793 B2 | 8/2012 | Kumhyr et al. | |
| 8,245,295 B2 | 8/2012 | Park et al. | |
| 8,255,341 B2 | 8/2012 | Gross et al. | |
| 8,332,945 B2 | 12/2012 | Kim et al. | |
| 8,457,913 B2 | 6/2013 | Zwinger et al. | |
| 8,537,050 B2 | 9/2013 | Freeman et al. | |
| 8,643,539 B2 | 2/2014 | Pauly et al. | |
| 8,825,823 B2 | 9/2014 | Keller, III | |
| 8,892,903 B1* | 11/2014 | Trimberger | G06F 21/558 713/189 |
| 9,059,189 B2* | 6/2015 | Keller | H01L 23/576 |
| 2001/0033180 A1 | 10/2001 | Swart et al. | |
| 2001/0037458 A1 | 11/2001 | Kean | |
| 2002/0061668 A1 | 5/2002 | Fujimura | |
| 2002/0079881 A1 | 6/2002 | Hiromatsu | |
| 2004/0068386 A1 | 4/2004 | Smith et al. | |
| 2005/0144612 A1 | 6/2005 | Wang et al. | |
| 2005/0184028 A1 | 8/2005 | Baur et al. | |
| 2005/0184236 A1 | 8/2005 | Baur et al. | |
| 2006/0164115 A1 | 7/2006 | Komiya et al. | |
| 2006/0253762 A1 | 11/2006 | Schalick | |
| 2007/0024293 A1 | 2/2007 | Kosaka et al. | |
| 2007/0257025 A1 | 11/2007 | Nordstrom et al. | |
| 2007/0283166 A1 | 12/2007 | Yami et al. | |
| 2008/0054925 A1 | 3/2008 | Ohkura | |
| 2008/0088336 A1 | 4/2008 | Pommerenke | |
| 2008/0091975 A1 | 4/2008 | Kladko et al. | |
| 2008/0191726 A1 | 8/2008 | Ku et al. | |
| 2009/0019546 A1 | 1/2009 | Park et al. | |
| 2009/0044057 A1 | 2/2009 | Choate et al. | |
| 2010/0030497 A1 | 2/2010 | Zavadsky et al. | |
| 2010/0033199 A1 | 2/2010 | Komatsu et al. | |
| 2010/0100694 A1 | 4/2010 | Maheffey et al. | |
| 2010/0132048 A1 | 5/2010 | Hall et al. | |
| 2010/0213960 A1 | 8/2010 | Mok et al. | |
| 2010/0332199 A1 | 12/2010 | Dhanekula et al. | |
| 2011/0002186 A1 | 1/2011 | Buonpane et al. | |
| 2012/0179812 A1 | 7/2012 | Keller, III | |
| 2012/0223403 A1 | 9/2012 | Keller, III et al. | |
| 2012/0226463 A1 | 9/2012 | Keller, III et al. | |
| 2012/0278893 A1 | 11/2012 | Jyothi et al. | |
| 2013/0044003 A1 | 2/2013 | Eguro et al. | |
| 2013/0063179 A1 | 3/2013 | Myers et al. | |
| 2013/0108145 A1 | 5/2013 | Cobb et al. | |
| 2013/0127442 A1 | 5/2013 | Satoh et al. | |
| 2013/0318607 A1 | 11/2013 | Reed et al. | |
| 2014/0100807 A1 | 4/2014 | Rosenblatt et al. | |
| 2014/0182373 A1 | 7/2014 | Sbihli et al. | |
| 2014/0195184 A1 | 7/2014 | Maeda et al. | |
| 2014/0218229 A1 | 8/2014 | Pauly et al. | |
| 2014/0223554 A1 | 8/2014 | Roden, III | |
| 2014/0259161 A1 | 9/2014 | Kastner et al. | |
| 2014/0304826 A1 | 10/2014 | Bytheway et al. | |
| 2015/0009073 A1 | 1/2015 | Keller, III | |
| 2015/0317475 A1* | 11/2015 | Aguayo Gonzalez | G06F 21/55 726/23 |
| 2017/0310482 A1* | 10/2017 | Reed | G06F 11/3062 |

OTHER PUBLICATIONS

Gonzalez, CR Aguayo, and Jeffrey H. Reed. "Dynamic power consumption monitoring in SDR and CR regulatory compliance." Sdr Forum Conference. DC. 2009.

Tehranipoor, Mohammad, and Farinaz Koushanfar. "A survey of hardware Trojan taxonomy and detection." IEEE Design & Test of Computers (2010).

Agrawal, Dakshi, et al. "Trojan detection using IC fingerprinting." Security and Privacy, 2007. SP'07. IEEE Symposium on. IEEE, 2007.

Plusquellic, James F., Donald M. Chiarulli, and Steven P. Levitan. "Digital integrated circuit testing using transient signal analysis." Test Conference, 1996. Proceedings., International. IEEE, 1996.

Germida, Amy, et al. "Defect detection using power supply transient signal analysis." Test Conference, 1999. Proceedings. International. IEEE, 1999.

Baturone, I., et al. "Supply current monitoring for testing CMOS analog circuits." Proc. XI Conference on Design of Circuits and Integrated Systems (DCIS), Sitges. 1996.

Stone, Samuel, and Michael Temple. "Radio-frequency-based anomaly detection for programmable logic controllers in the critical infrastructure." International Journal of Critical Infrastructure Protection 5.2 (2012): 66-73.

Guin, Ujjwal, et al. "Counterfeit Integrated Circuits: A Rising Threat in the Global Semiconductor Supply Chain." Proceedings of the IEEE 102.8 (2014): 1207-1228.

Clark, Shane S., "The security and privacy implications of energy-proportional computing." Diss. University of Massachusetts Amherst, 2013.

Stone, Samuel J., "Radio Frequency Based Programmable Logic Controller Anomaly Detection," No. AFIT-ENG-DS-13-S-05. Air Force Inst of Tech Wright-Patterson AFB OH Graduate School of Engineering and Management, 2013.

Reed, J.H. et al. "Enhancing Smart Grid Cyber Security using Power Fingerprinting," IEEE, Future of Instrumentation International Workshop (FIIW), 2012, pp. 1-3.

Soll, O, et al. "EM-based Detection of Hardware Trojans on FPGAs," IEEE International Symposium on Hardware-Oriented Security and Trust (Host), 2014, pp. 84-87.

Cardoso, Bill et al., "X-Ray Inspection Techniques to Identify Counterfeit Electronic Components", ECN Magazine, Mar. 11, 2014, 6 pgs., Downloaded on Nov. 11, 2015 at http://www.ecnmag.com/articles/2014/03/x-ray-inspection-techniques-identify-counterfeit-electronic-components.

Office Action for U.S. Appl. No. 14/720,497, dated Aug. 7, 2015.

International Search Report and Written Opinion for PCT/US16/18940, dated May 11, 2016.

(56) References Cited

OTHER PUBLICATIONS

Extended Search Report for European Application No. 16800427.3, dated Sep. 25, 2018, 9 pages.

* cited by examiner

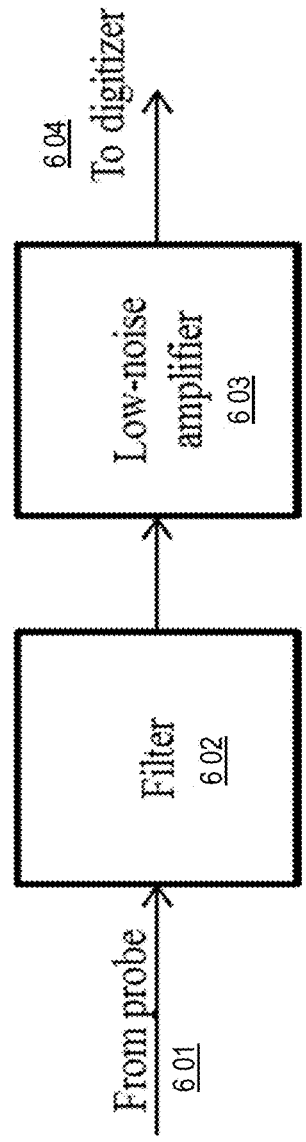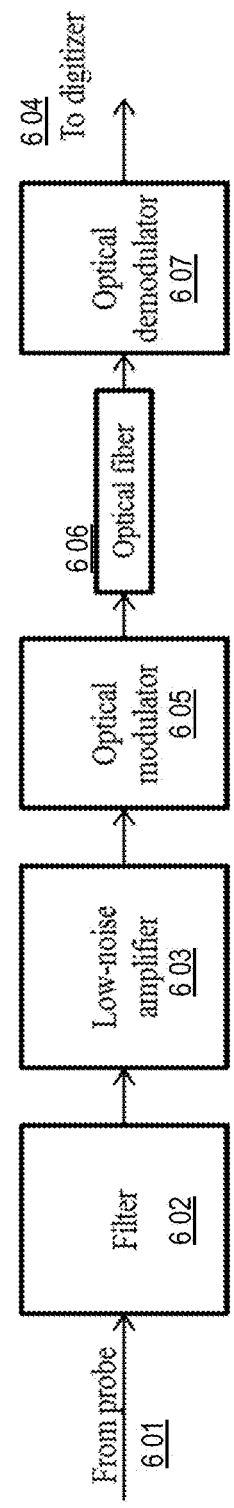
FIG. 6A
Example Embodiment of Analog Processing (2 02)
FIG. 6B
Example Embodiment of Analog Processing (2 02)

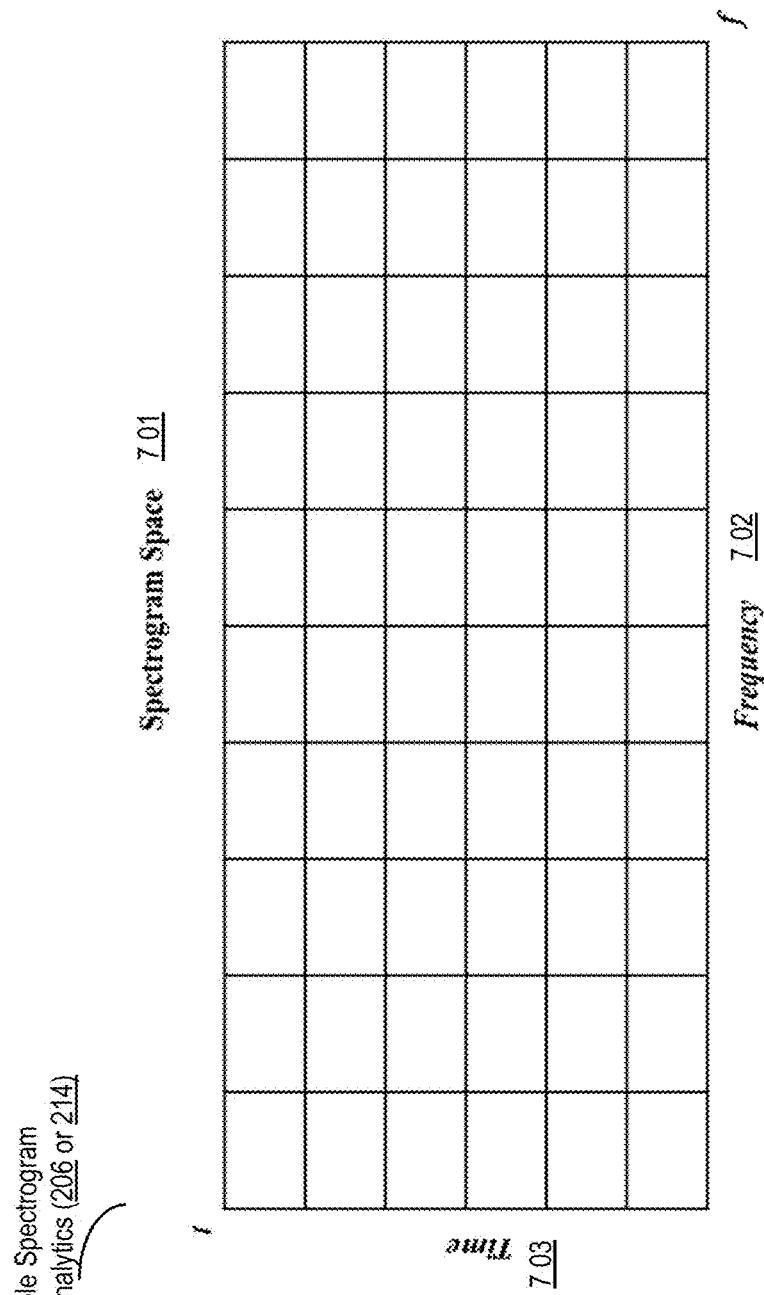

Example Implementation of Analytics (206 or 214)

Example Implementation of Decision (206b)

Example Network Implementation (2.11)

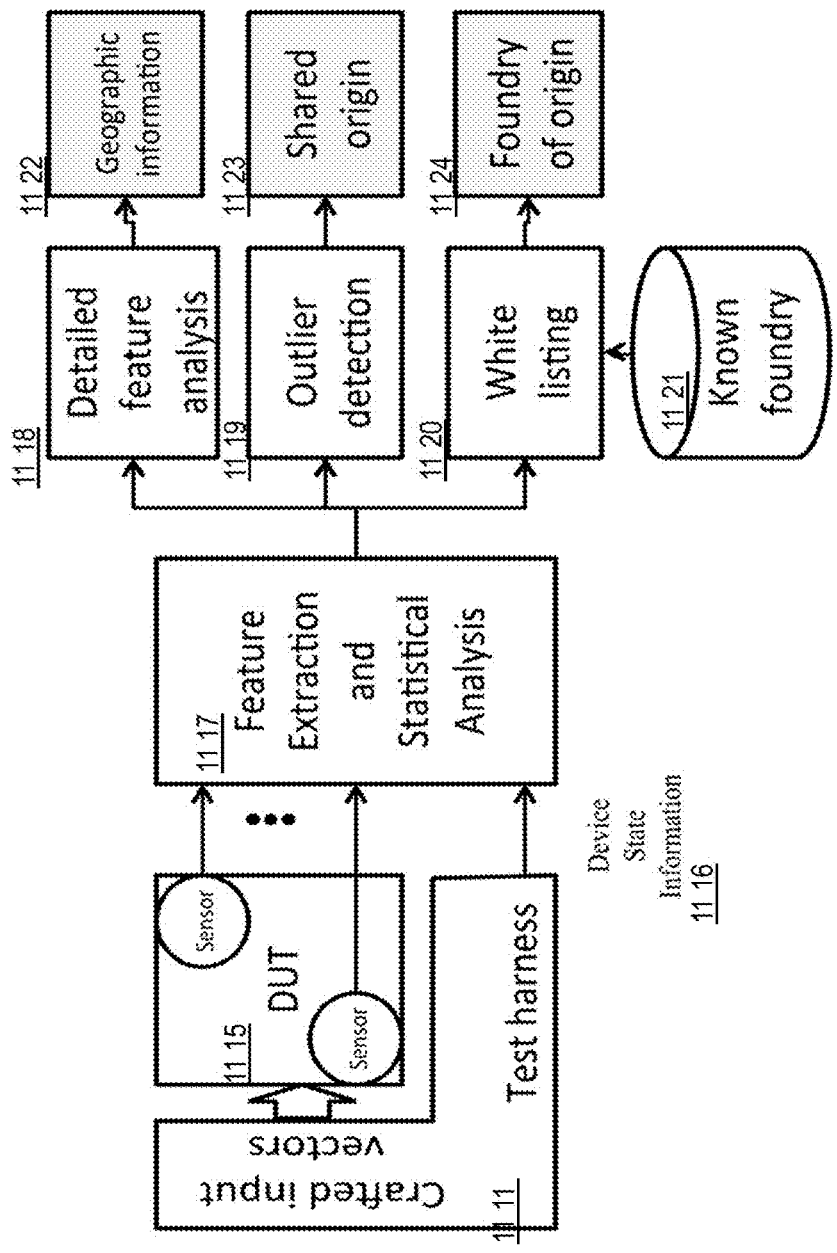

SYSTEMS, METHODS, AND APPARATUSES FOR INTRUSION DETECTION AND ANALYTICS USING POWER CHARACTERISTICS SUCH AS SIDE-CHANNEL INFORMATION COLLECTION

CROSS-REFERENCE TO RELATED APPLICATION

This application is a continuation of U.S. patent application Ser. No. 14/881,862 (now U.S. Pat. No. 9,411,009), entitled "Systems, Methods, and Apparatuses for Intrusion Detection and Analytics Using Power Characteristics Such as Side-Channel Information Collection," filed Oct. 13, 2015, which is a divisional application of U.S. patent application Ser. No. 14/720,497 (now U.S. Pat. No. 9,268,938), entitled "Systems, Methods, and Apparatuses for Intrusion Detection and Analytics Using Power Characteristics Such as Side-Channel Information Collection," filed May 22, 2015, each of which is incorporated herein by reference in their entirety.

BACKGROUND

A processor-based device or system is powered by electricity power, which facilitates data exchange and storage at circuit units. For example, in Complementary Metal-Oxide-Semiconductor (CMOS) digital circuits, with every bit transition a transient current drain results from a brief short circuit in the gates and the charge and discharge of parasitic capacitance at the outputs of the circuit. Hence, the total power consumed in a specific clock cycle is determined by the total number of bit transitions that take place in that clock cycle. The number of bit transitions is determined by the specific instruction sequence executed, as well as their addresses and parameters. When a disruption of the execution of the specific instruction sequence occurred, such disruption is reflected in the transient currents at the digital circuit level, and thus the consumption of the electric power.

SUMMARY

Some embodiments described herein include an apparatus. The apparatus comprises a probe component that is configured to capture side-channel information relating to an operation status of a target device when the probe component disposed proximate to the target device. The apparatus further comprises a fixture mechanism, which is configured to fixedly hold the probe component on the target device. The apparatus further comprises a processor communicatively coupled to the probe component. The processor is configured to process the side-channel information to extract a first characteristic of the side-channel information. The processor is further configured to retrieve previously-stored reference side-channel information having a second characteristic and representing a normal activity of the target device, and compare the first characteristic with the second characteristic to determine an anomaly of the target device. The processor is further configured to send to a user interface an alert indicative of an anomaly based on the first characteristic and the second characteristic.

Some embodiments described herein include an apparatus. The apparatus includes a probe component configured to capture side-channel information relating to an operation status of a target device when the probe component disposed proximate to the target device. The apparatus further comprises a positioner device, disposed in connection with the probe component, configured to adjust a position of the probe component. The apparatus further comprises a processor, communicatively coupled to the probe component and the positioner device. The processor is configured to place, via the positioner device, the probe component at a first position, and capture, via the probe component at the first position, a first set of side-channel data. The processor is further configured to obtain, from a data analytics component, feedback relating to the first set of side-channel data, based on which the processor determine a quality metric associated with the first position. The processor is further configured to send a signal to the positioner device to adjust the positioner device to place the probe component at a second position when the quality metric is below a predefined threshold level.

Some embodiments described herein include an apparatus. The apparatus comprises a plurality of probe elements, each of which is configured to capture side-channel information relating to an operation status of a target device when the probe component disposed proximate to the target device. The apparatus further comprises a processor communicatively coupled to the probe component and the positioning device. The processor is configured to obtain a request to capture a first set of side-channel information associated with a first feature. The processor is further configured to select a first probe element from the plurality of probe elements based on the first feature, and capture the first set of side-channel information via the first probe element. The first probe element is configured to capture the first set of side-channel information with a data quality with respect to the first feature greater than a data quality with respect to the first feature for a second probe element from the plurality of probe elements.

Some embodiments described herein include a processor-implemented method. The method comprises obtaining a request to capture a set of side-channel information, and then sending a signal to cause a probe component to capture a set of side-channel information relating to an operation status of a target device that operates via an execution of a code segment. The method further comprises receiving, from an external timing source, an indication including a timestamp along with the set of side-channel information. The timestamp indicates a timing reference relating to the operation status of the target device. The method further comprises associating the set of side-channel information with the operation status of the target device based on the timestamp, and sending, to a data storage element, the set of side-channel information that is associated with the operation status of the target device at the timestamp.

Some embodiments described herein include an apparatus. The apparatus comprises a circuit anomaly detection component configured to monitor a change of state in a pin on a target circuit chip that indicates that a reprogrammable component on the target circuit chip is reprogrammed. The apparatus further comprises a notification component, communicatively coupled to the circuit anomaly detection component. The notification component is configured to transmit a notification message including the change of state, to an entity designated to respond to a detected anomaly.

BRIEF DESCRIPTION OF THE DRAWINGS

FIGS. 6A-6B provide example block diagrams illustrating work flows of an analog processing module (e.g., 202 in FIGS. 2A-2D), according to an embodiment.

FIG. 7A provides an example data plot diagram illustrating example spectrogram from the analytics module (e.g., 214 in FIG. 2A), according to an embodiment.

FIG. 11 provides a block diagram illustrating aspects of an example PFP application in foundry and counterfeit identification, according to an embodiment.

DETAILED DESCRIPTION

Embodiments disclosed herein relate to integrity assessment and intrusion detection systems that can detect malicious intrusions, unauthorized modifications, and tampering in digital circuits and computer-based systems, including critical embedded systems, coprocessors, and field-programmable gate arrays (FPGAs). In some instances, a physical side-channel (e.g., indirect measure of program execution such as power consumption or electromagnetic emissions and other physical signals) can be used to assess the execution status in a target processor system (e.g., digital circuit or computer system) using an external monitor and detect when an unauthorized execution has managed to disrupt the normal operation of the target device or system. This process of detecting program execution anomaly is referred herein as "fingerprinting"; methods and apparatuses that implement fingerprinting can be referred to as a fingerprinting system or a system, which can be embodied in a number of different ways and forms. In some instances, such fingerprinting can use, for example, a physical side channel to detect an anomaly in the operation of a target device or system.

Figure 1:
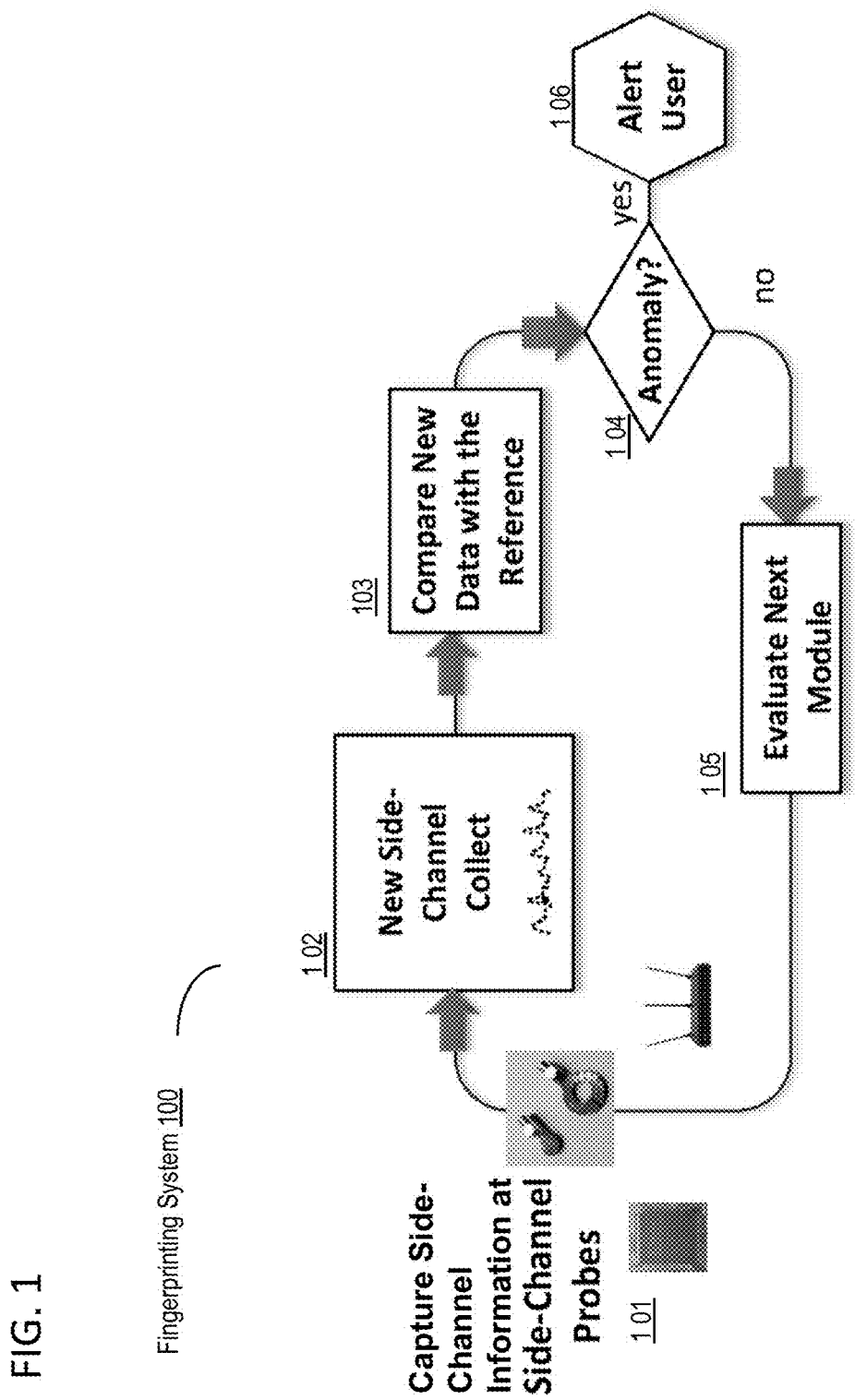
FIG. 1 is a combined system structure and work flow diagram illustrating aspects of anomaly detection based on side-channel information measured by side-channel probes, according to an embodiment.

FIG. 1 is a combined system structure and work flow diagram illustrating aspects of a fingerprinting system 100 for anomaly detection based on side-channel information measured by side-channel probes. As shown in FIG. 1, side-channel probes 101 can capture side-channel information (e.g., power consumption or electromagnetic emissions and other physical signals, etc.). In some instances, the side-channel information can be used in conjunction with other physical sensor signals such as temperature, vibration, pressure, timing, global positioning system (GPS) coordinates, and/or the like. The fingerprinting system 100 can collect new side-channel collected information at 102 and then compare the newly-collected side-channel information with previously-stored reference data (e.g., historical reference power consumption records, etc.) at 103. Based on the comparison, the fingerprinting system 100 can determine whether there is an anomaly of the measured target device/system at 104. If yes, the fingerprinting system can alert a user at 106. Or otherwise if no anomaly is detected at 104, the fingerprinting system 100 can move on to evaluate a next device or module at 105.

Note that although many embodiments are described herein as relating to the capture of side-channel information during the operation of an electronic device, in alternative embodiments side-channel information can be captured from an electronic device during the excitation with an external signal. Such an external signal can be, for example, an electromagnetic interference (EMI) pulse, a white noise signal and/or an ultra-wide band signal. Such capture during the excitation with an external signal can be performed when the electronic device is not operating or when the electronic device is operating.

Figure 2A:
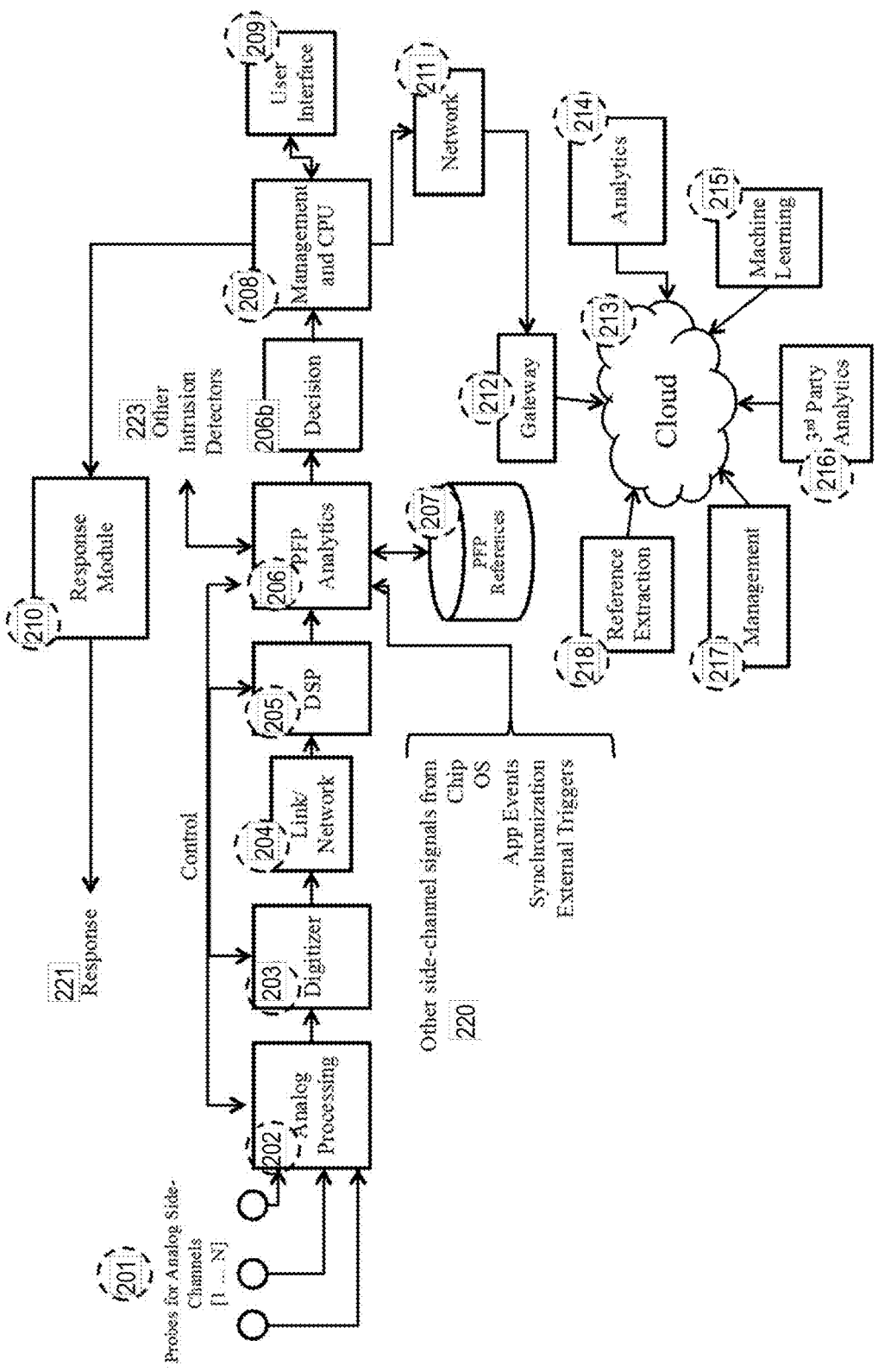
FIG. 2A-2D provide various system diagrams illustrating system infrastructure of a power fingerprinting (PFP) system using side-channel probes, according to various embodiments.

FIG. 2A-2D provide various system diagrams illustrating various examples of a system infrastructure of a power fingerprinting (PFP) system using side-channel probes. As shown in FIG. 2A, the PFP system can include analog side-channels probes 201 that transmit collected side-channel information to the analog processing unit 202 for an electronic device under test (also referred to as a target device or a target). The electronic device under test can include, for example, an integrated circuit (IC) (also referred to as a "chip") and operate using an operating system (OS) and a software application(s) capable of generating application events. Although the discussion here is generally in the context of a single target device, it should be understood that multiple target devices can be analyzed simultaneously. The probes in the PFP system capture side-channel information and other physical information from the electronic device under test that is then fed to the other components of the PFP system. The PFP can use different probes, for different side-channels, with different physical locations, configurations, and/or orientations to capture some more or all the usable signals and add diversity to the measurements when such diversity is possible and useful. The probes 201 that can be used by the fingerprinting system include, but are not limited to: acoustic and vibration detectors, temperature detectors, electro-magnetic (such as electric current (e.g. current probes, hall effect sensors, radio frequency (RF) transformers, current mirrors, shunt resistors, etc.) detectors, electric and magnetic flux detectors, electro-magnetic radiation detectors, near-field radiation detectors, etc.), position detectors, distance detectors, angle detectors, speed detectors, acceleration detectors, light and optical detectors, environmental detectors: moisture, humidity, pressure, force, level, circuit delay, and/or the like.

The analog processing unit 202 can then send the received side-channel information to a digitizer 203 to convert the analog data to digital signals. The analog processing unit 202 performs signal conditioning and processing before digitization, and transforms input analog signals to monitor the spectrum to reduce extraneous information that need not be digitized. For example, a basic structure of the analog processing unit 202 includes a filter and a low-noise amplifier, to filter and amplify the received signals from probes 201. The analog signal processed at the analog processing unit 202 may be placed on a transport mechanism, such an optical as fiber for digitization at some alternative and/or centralized location. The analog signal processing unit 202 can include multi-element sensor processing, e.g., elements of a sensor array may be processed before digitization through selection or analog combining. The analog signal processing unit 202 can further include clock recovery using analog synchronization, and channelization of a signal into various bands for parallel sampling using lower speed converters on desirable bands. Further example infrastructure and functionality of the analog processing 202 are discussed in connection with FIGS. 6A-6B.

The digitizer 203 can convert the analog signals into the digital domain to be processed with computers and/or digital circuits. The digitizer 203 can be implemented using an analog-to-digital Converter (ADC). Alternatively, the digitizer 203 can use other techniques and approaches to perform the conversion with fewer processing resources or without specialized hardware. For example, the digitizer 203 can use zero-crossings to digitize the signals from the probes 201 or to estimate their spectrum. Such techniques are based on the durations of zero crossing separations to infer frequency content of the signal. A histogram of zero crossing intervals can reveal spectral content of the signal. A zero-crossing detector can be created by a high-speed counter (register) with an unload-and-clear based on a zero-crossing detector (comparator) with input on the comparator biasing. Further details of implementing a zero-crossing detector can be found in U.S. Pat. No. 5,301,123, entitled "Zero Crossing Based Spectrum Analyzer And Method," which is herein expressly incorporated by reference.

For another example, the digitizer 203 can adopt compressive sampling techniques that allow for reduced sampling rates in PFP, in which the sparseness or compressibility of the signal in some domain allows the under-sampling while still being able to reconstruct the signal without distortion or with minimal distortion. Because the ultimate goal of the fingerprinting system shown at FIG. 2A is to assess the integrity of the target system and not to reconstruct the signals captured by the probe sensors 201, the digitizer 203 is desired to be robust to some level of aliasing introduced during digital conversion. Therefore, it is possible to obtain acceptable performance assessment even when the sampling rate of the digitizer 203 does not strictly meet the Shannon-Nyquist sampling criterion. An example implementation might initially sample the waveform at a rate satisfying the Shannon-Nyquist sampling criterion and compressive sampling techniques would be applied to find a minimal distortion from reducing the sampling rate below the Shannon-Nyquist threshold.

As part of this digitization process at the digitizer 203, however, it is also possible to provide ADC sample rate control for compressive sampling from the processing modules. Alternatively the sample rate control and filtering control may be coordinated to sample the most desirable parts of the signal (e.g., feature-rich portions of the signal that can be used to better detect anomalies). One example for controlling the sample rate is to search an over-sampling rate using the structure in FIG. 2A to find distinct features for subsequent anomaly detection. In this case, it may not be necessary to recover the signal from probes 201; instead, the fingerprinting system can identify anomalous spectral characteristics from previously identified anomalies, so aliasing is acceptable to some extent.

The digitized signals from the digitizer 203 can be passed, e.g., via a link or network connection 204, to the discrete-time signal processor (DSP) 205, e.g., to generate frequency domain signal components of the digitized signals for frequency domain analysis. When the digitizer 203 and the rest of the digital signal processing components are collocated, digitized signals can be transferred the traces to the DSP module 205 directly, e.g., through a memory buffer, inter-process communications, etc. After the signals are digitized, however, they can be stored for later processing or transferred to another location to be processed. Thus, the link or network 204 between the digitizer 203 and the DSP 205 can be a direct connection, a storage element for later processing, or a network connection for sending the digitized signals to a remote location. For added security, the network 204 may be physically or logically separated from the other network that carries traffic for the device being monitored. In some cases, encryption of the link or network 204 for added security may be desirable. Examples of this link 204 may include a direct wire, Ethernet, or a wireless connection such as a WiFi connection.

The PFP analytics 206 can process data received from the DSP 205 (e.g., frequency components of the digitized side-channel information, etc.), and perform PFP analysis to determine anomaly or intrusion. The PFP analytics 206 can include multiple processor engines to extract features, fuse sensors, make assessment decisions, learn, and control the general execution. For example, the PFP analytics 206 can extract features from the side-channel information, which can be performed locally at the PFP analytics 206, or alternatively at the reference extraction module 218 within or in connection with a cloud infrastructure/service 213.

The PFP analytics 206 can include a feature extraction engine to perform different signal processing approaches to extract discriminatory features from the signals captured by the probe sensors 201 that uniquely identify the execution status in the target system. Feature extraction can involve analysis in different domains, including, but not limited to the time domain, frequency domain, and cyclostationary domain. The specific feature extraction algorithms and parameters that yield the best discriminatory features typically depend on the specific target. Therefore, the features selected are those that yield the best discriminatory qualities from a set of analysis approaches, algorithms, and parameters. The number of feature extraction approaches can be selected, including time-domain correlation, higher-order statistics, order statistics, wavelet analysis, etc. Furthermore, for a chosen domain and analysis, several variants can be considered. For example, for analysis in the frequency domain, different approaches can estimate the spectrum content in a signal, such as Welch's method, Bartlett's method, autoregressive moving average estimation, cyclic spectral analysis, and also different variations and modifications to the analysis itself such as, for the same frequency domain example, Cepstrum instead of the spectrum of the signals.

In a further implementation, the PFP analytics 206 can select the specific feature extraction technique or techniques for a specific platform can be selected by finding the best features and/or combination of features during the characterization process under different restrictions, including analysis methods available, processing resources, and other design factors, such as aliasing from subsampling. Further implementations and performance of the PFP analytics 206 are discussed in FIGS. 7A-7D.

In a further implementation, the feature extraction engine also drives adaptive algorithms that control other modules and processes, for example the adaptive array algorithm and power conditioning. For example, certain frequency components may be emphasized or deemphasized to complement feature recognition and reduce the impact of random data, stray electromagnetic (EM) fields, or power line distortions. Power conditioning can also be used to aid in synchronizing program execution with the analysis window for feature extraction.

The PFP analytics 206 can then retrieve reference data from a PFP references database 207 to compare the reference data to the received side-channel information from DSP 205. For another example, the PFP analytics 206 can obtain additional side-channel signals 220 from various input sources, such as but not limited to the chip, operating system (OS), application events, synchronization events in the target device/system (e.g., an electronic device, a compute device, or a processor), external triggers, and/or the like. The reference data can be securely stored in the PFP references database 207 to be used in the assessment process. These reference data are normally extracted during a characterization process and can be updated when a new version of the software or hardware in the target system is released. Reference data may be stored locally or remotely.

Upon performing comparison and analytics, the PFP analytics 206 can forward comparison data to a decision module 206b to determine whether an intrusion or anomaly exists. In other instances, the PFP analytics 206 can send the analytics data to other intrusion detectors 223, e.g., another distributed PFP system, a third-party monitoring detector, and/or the like.

In one implementation, the decision module 206b can send a decision of anomaly detection to the management module and CPU 208 of the target device, which in turn controls a response module 210 to generate a response 221 to the detected anomaly. The management module and CPU 208 performs the general functions of the host and includes the user interface 209 for the target device. In addition to hosting the user interface 209, the management module and CPU 208 interfaces with the response 210 and the network 211 modules. The management module and CPU 208 can also host any or all of the processing modules in the architecture.

The response module 210 triggers automatic actions that affect the target device in response to integrity violations. Some of the actions/responses 221 can include, but not limited to activating another device, disabling control ports of the target device, notifying user of the target device, triggering the target device for reboot and reinitiating virtualization, extra intelligence/analysis, collecting data for forensics purposes, collecting data for a blacklist for spotting intrusions, and/or the like. Note that although the target device is frequently discussed herein as being an individual processor, the target device can an electronic device or a physical device such a switch, a valve, a pump, etc.

In addition to triggering the actual response and interfacing with the target device, the response module 210 may evaluate a response policy to determine the correct response to a given violation under specific circumstances. The response policy and the associated tools to interpret, reason, and enforce the response policy can be implemented in a wide variety of ways. For example, the response policy can be simply to notify the user using the UI 209 of any anomaly, but it can also be represented by complex rules expressed in a formal language. Also if an anomalous signature is detected and with confidence found to be malware, the malware can be stored and used (though a shared database residing in the cloud) to improve the detection of malware in other devices and for analysis of how the malware is spreading and to what extent.

In the case of that a virtual machine is running at the target device and anomalous behavior is found in one of the side channels, the virtual machine can be restarted or migrated. Note that this is a gain over known systems in which the virtual machine is restarted at intervals (regular or irregular) to clear out any infection that may have occurred since the last restart.

The response module 210 may also contain a policy engine, an engine that constrains the decisions based on the suitability of applying the decision for a specific application.

The management module and CPU 208 can also send a user alert via a user interface 209 about the detected anomaly. The user interface 209, hosted in the management module and CPU 208, includes, but it is not limited to: dashboard (status of target device or system under test), interfaces that collect user input, user configuration, user-set trust level (e.g., thresholds for detection and statistical metrics), general operating statistics (e.g., number of anomalous events, uptime, trends), and/or the like.

In a further implementation, the management module and CPU 208 can send an alert message of the detected anomaly or intrusion via a network 211 (as further illustrated in FIG. 8) and/or gateway 212 to a cloud 213. The gateway 212 is the point of interface between the private network 211 and the cloud 213. The gateway 212 provides basic protection and security (such as firewalls) for the private network 211.

The cloud 213 includes a collection of additional processing resources available in a remote location, either private or public, that can be accessed through a network and that extend the capabilities available for analysis. The cloud 213 usually includes a large number of processors and storage elements available through a public or private network. The cloud 213 can store and integrate the detected anomaly or intrusion information for further analytics 214 (as discussed in FIGS. 7A-7D) or third-party analytics 216, machine learning module 215 (as further discussed in FIG. 9), reference extraction module 218 (the extracted references can be updated with the PFP references database 207), management module 217, and/or the like.

To effectively use the cloud 213 for malware detection, it is desirable to protect the system traffic and provide cyber security measures to safeguard the privacy, availability, and integrity of traffic, data, and services. Part of the protection can include strong authentication for the different subsystems. Thus, the cloud 213 can also be used to deliver updates for the PFP system assessment and security.

Furthermore, cloud-based distributed parallel processing allows the offloading of fingerprinting system processing to remote computer clusters with relatively ample and inexpensive computational resources to accelerate the assessment and further reduce local processing requirements.

The (remote) analytics module 214 enables heavier data analysis that is enabled by additional computational resources available at a remote site. Part of the analytics performed by analytics module 214 can include forensic analysis and interface with other intrusion detection approaches. The fingerprinting system can also build a new set of references remotely by simulating, emulating (similar type of hardware), or model-building the target device. With this approach, it is possible to further improve the security and trustworthiness of the PFP system by performing the comparison against the reference data (or traces) remotely. In this case, the target device can be requested to send the discriminatory features resulting from the execution with a specific set of input vectors, in a challenge/response approach. Such input vectors can be, for example, the data or conditions used to trigger operation of the target device. Such input vector can be selected, for example, by random, to produce particular (or desired) features upon execution of the target device, or to exercise different sections (or portions) of the target device. The observed features are then compared against the references data obtained through emulation or simulation in the remote location, detecting any potential tampering of the fingerprinting system at the local level.

The machine learning module 215 uses patterns and correlations identified with analytics from the analytics module 214; machine learning can be used for prediction of potential attacks. Further details of the machine learning module 215 are discussed in FIG. 9.

In some instances, the fingerprinting system also interfaces and supports or leverages third-party analytics 216 to gain insight into general trends. The fingerprinting system can also provide valuable integrity data and threat propagation with fine-granularity and detailed timing information to help improve general data analytics. As an example, Security Information and Event Management (SIEM) software is typically used in industrial settings for monitoring the operation of Supervisory Control and Data Acquisition Systems (SCADA) and security is a desirable application for such software. Systems using SIEM software are capable of performing or presenting information gained from data analytics. The fingerprinting system can feed a system using SIEM software, though presentation of either processed data or raw data, in addition, the context of the data is also furnished by the fingerprinting system. Such context could include parameters for hypothesis testing, time window for measuring and forgetting events, threshold values, and policy for how to handle events detected by the PFP system. Joint processing and/or display of side-channel anomalies in time can provide insight into how the malware is spreading and its origin.

In yet another example, the third-party analytics 216 can be, include or be coupled to a security operations center (SOC) that receives data and/or alerts from the fingerprinting system in addition to or in the alternative to other types of security-related data and/or alerts. In such an SOC, the data and/or alerts from the fingerprinting system can provide specific and targeted information (e.g., at the device, chip or component level) as to the location of a possible security breach. Such information can be, for example, analyzed with respect to other security-related data and/or alerts to determine the extent to which a particular security problem identified by the fingerprinting system has proliferated or affected other parts of a network or system. By identifying the portions of a network or system affected by that device (or chip or component) as determined by the fingerprinting system or using the fingerprinting data/alerts, the SOC can remove those affected parts of the network or system from consideration and focus on the remaining parts of the network or system to determine remaining or potential security problems.

The management module 217 provides general services to update and maintain fingerprinting systems operating correctly and maintaining high levels of intrusion detection performance. Management services include, but are not limited to, the following: general system updates, general maintenance, logs and statistics, system reference distribution, policy for how to handle events.

The reference extraction module 218 generates reference data that drive the integrity assessment performance (the PFP reference extraction process is also referred to as Characterization process). One example approach for reference extraction is to test the target device in a known good state (without malware of hardware problems) and provide a set of testing situations that covers all or part of the target device's possible execution paths. Repeated testing and collection may be applied to help produce a reference that has fewer stray features (e.g., noise or processing interruptions such as memory refresh) and for averaging such features to reduce the noise.

There are several options to facilitate and enhance the extraction of trusted reference data, including: crowd sourcing (e.g., by obtaining numerous references from multiple sources to define what is a normal power signature), learning in the field (repeated observations of a power trace to define what historically constitutes a normal power signature), and/or the like. Such observations will also help calibrate slow changes to the normal power signature that may occur at aging circuits. Learning may be implemented by simple averaging or more complex generalized learning using for instance a neural network. In addition, the reference extraction can be implemented via simulation (references are extracted from a circuit or behavior-modeling program), emulation (references are extracted by a testing a different but identical or similar device that is or has executed similar or identical code running on the target device under test), determining manufacturing origin and/or age, searching broad set of parameters for feature extraction. The reference extraction module 218 can further extract statistics of the data to determine if a fuzzing attack is occurring (e.g., to aid if an attack is not at the code level rather an attack that provides data that doesn't correspond to the expected format (for example, a buffer overflow attack), the target device under test can be presented with a wide variety of input vectors, and statistically characterize the response to the normal presentation of data to define a statistical reference model for determining anomalous input data that could represent an attack).

For example, the reference extraction module 218 may include crowd source anomaly detection using population of similar devices. When a number of PFP systems are deployed, it is possible to follow a crowd sourcing approach to establish a baseline, instead of a deliberate characterization campaign for each system. Such a PFP system, will with large numbers of sources, allow for the identification of normal and/or abnormal behaviors. To implement such an approach, the execution behavior from a large number of identical devices as a response from a specific request is used for characterization in an unsupervised approach. A database of side-channel fingerprints can be built with information such as code executed, model number, date of manufacture, temperature, and distributor to name a few. This database provides a baseline for comparison across a large user base with varied conditions. Data may be solicited by the fingerprinting system or it may be offered by target devices under test at remote locations.

As another example, the reference extraction module 218 can include emulation as a source of anomaly detection using hardware or software models, e.g., to have a similar unit(s) to the target device under test executing the same or similar code while measuring the side-channel response. Alternatively, a power consumption model may be defined for the target device under test. Such a model may be defined by learning techniques or through circuit or behavior simulation approaches. Further examples and applications of reference extraction module 218 (including applications in flash/BIOS monitoring and counterfeit identification) are provided in connection with FIGS. 10-11.

In some instances, such as virtualization or cloud services, test vectors may be sent from one machine to another machine. The receiving machine would present its power consumption profile to the requesting machine and if found to be within bounds and then an application will be instantiated on the verified machine. Likewise, as the program executes test vectors can be sent to the target device under test by an external device (from an internal test routine) to see if the target device is infected.

Figure 2B:
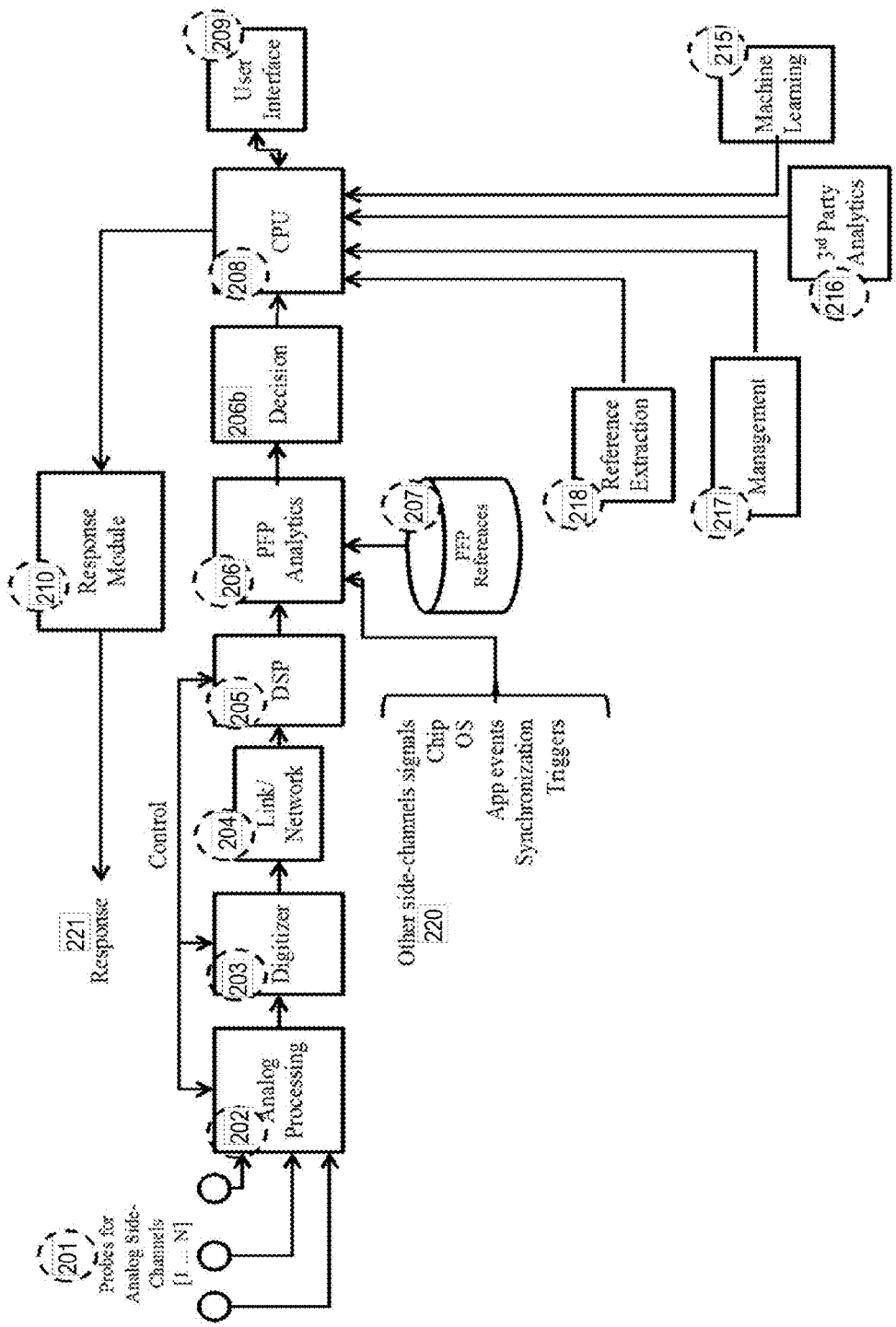

The PFP system infrastructure shown in FIG. 2A can be modified to meet various constraints in the target environment. For instance, for target environments where no network is available or where access to an external network is limited, such as critical infrastructure sites, the PFP system in FIG. 2A can be modified to a stand-alone configuration, with certain modules removed but maintaining the bulk of the functionality. FIG. 2B shows a customized configuration for a target environment without access to external network 211 or cloud service 213. As shown in FIG. 2B, machine learning module 215, third-party analytics 216, management module 217 and/or reference extraction 218 can be implemented locally by being connected to the management module and CPU 208.

Figure 2C:
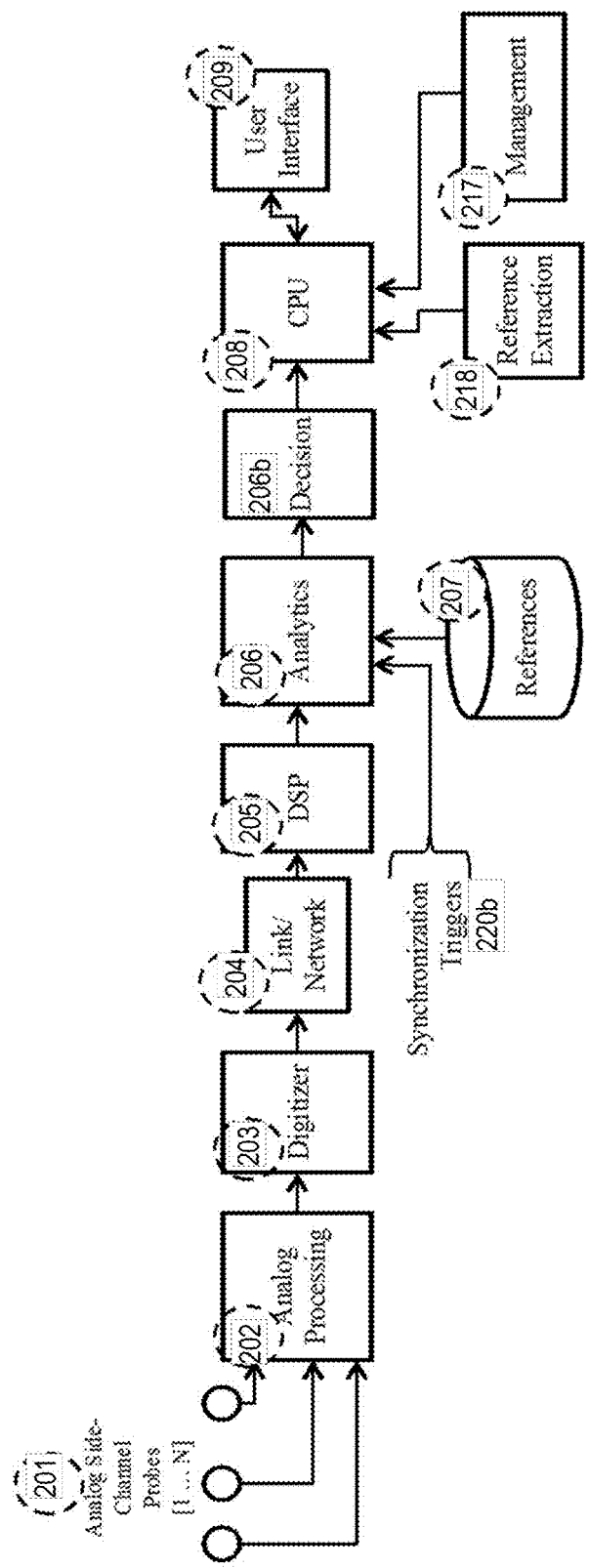

FIG. 2C shows a further modified system, e.g., into a minimum stand-alone configuration, where only a minimum set of modules are present to provide monitoring functionality For example, the system infrastructure in FIG. 2C can be operated without external network 211 or gateway 212, cloud 213, response module 210, and/or the like.

Figure 2D:
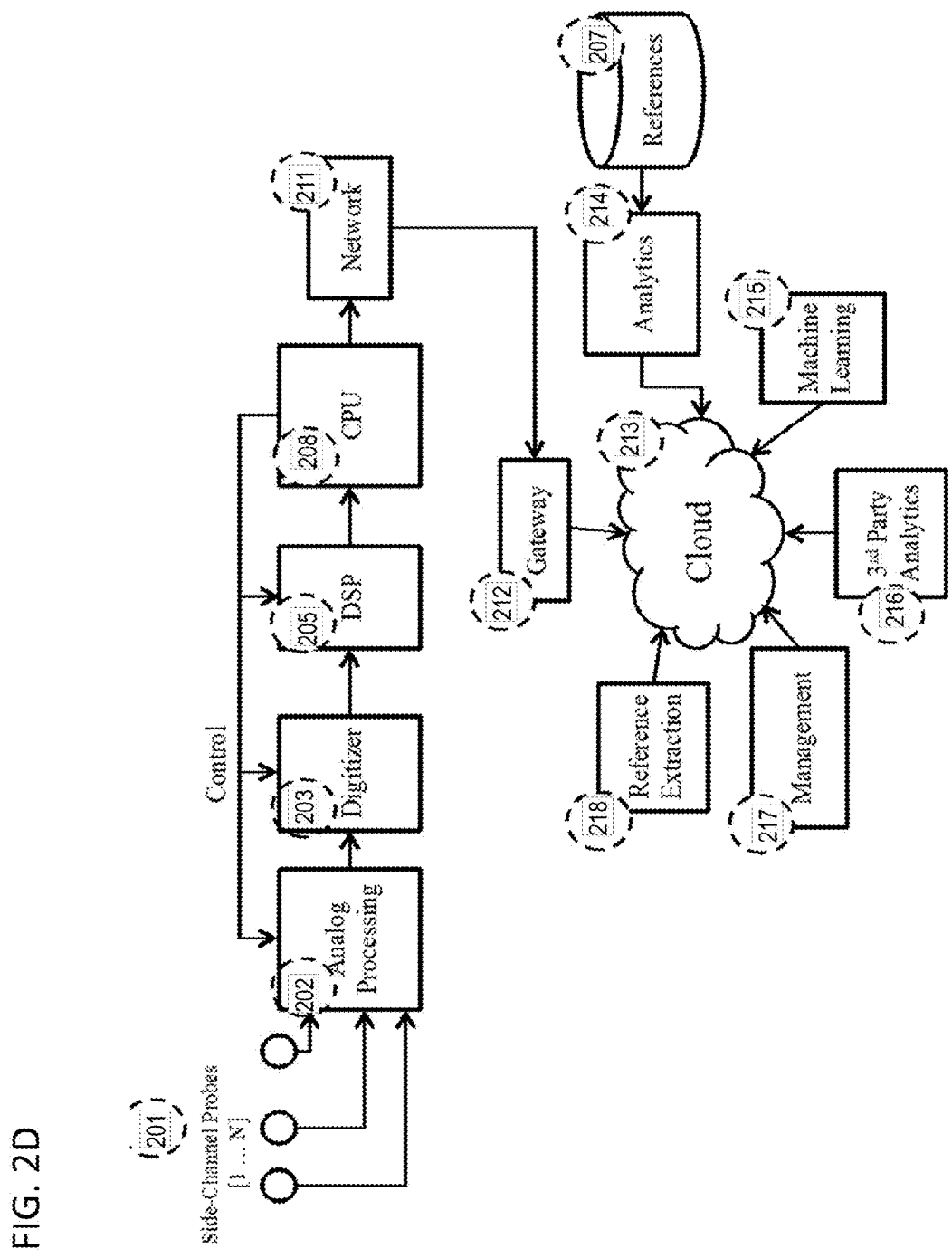

FIG. 2D shows another configuration for deployment on targets with constrained resources available on site, but with sufficient network connectivity to enable the utilization of remote resources. This configuration allows for a minimum footprint on the target environment. For example, the PFP system configuration shown in FIG. 2D includes network connection 211 such that the system is connected to the cloud 213; and instead of local PFP analytics module 206, the PFP system can rely on remote analytics 214 based on data from the cloud 213, and store/update reference data at the reference database 207, which can be either local or part of a remote data cloud.

When the fingerprinting systems described in FIGS. 2A-2D are implemented at the chip level (semiconductors), even in a basic fashion where the sensors are implemented at the silicon level and different electric signaling within the target device are available to the sensors for analytics, for synchronization and as general inputs, the performance of fingerprinting can be enhanced. Thus, the fingerprinting system enables semiconductor designers to enhance the monitoring capabilities of their target systems with an orthogonal monitoring system. Some of the benefits provided by the chip level implementation include, for example: active power fingerprinting, massive number of sensors, analysis/processing, decision making, sequencing power events in time and location, quick response, integrating with power management.

The on-chip sensor may be located in a processor, support chip, or in the power management chip, and may detect voltage, current, power, signal delay, radiation, audio and/or temperature. The power management chip may alter features of the power signal, within the operating parameters of the circuit, to better enable the reference collection and monitoring process. For example, the power management ship might equalize the frequency content of the power signal (possibly through modulation changes with the switching power supply) or slightly vary the amplitude of the input signal to provide better features of the baseline code or hardware or fine-tune circuit parameters to better isolate power rails and reduce cross-interference from other circuit elements. Power management chips may also perform voltage scaling, and interpretation of anomalous side-channel information may depend on coordination with the voltage level from the power management chip. Power management chips may also be involved in frequency scaling (or it could be done by a processor) and the interpretation of anomalous side-channel information may depend again on coordination with the power management chip. To deal with the changes in power management in anomaly detection, a different reference power signature could be used that is calibrated for this power condition or a transformation might be applied to the reference signature or collected signature to compensate for the new power management state, for instance a slower clock speed may be compensated for at the reference by stretching the reference signal in time to scale with the slower clock speed. The power management chip may execute a power policy, for example undervolting for a laptop computer to reduce power consumption. Likewise, there may be a security policy for power (resident on the power management chip or with an external processor) that facilitates side-channel anomaly detection or known power signature detection of certain instructions. Varying the power level could be part of an overall strategy of side-channel monitoring strategy since additional power will impact device non-linearities and the circuit performance with additional heating that occurs at higher supply voltages. Furthermore, significant spikes in voltage/current/environment (e.g., heat) from extraneous sources may cause some disruption in the regulatory function of the power management chip, and notification of such events detected in the power management function can be used to inform the decision making process and reduce the false alarm rate. Subsequent processing may also be accomplished in the power management chip, which can have a similar infrastructure as that in FIG. 2A.

Figure 3A:
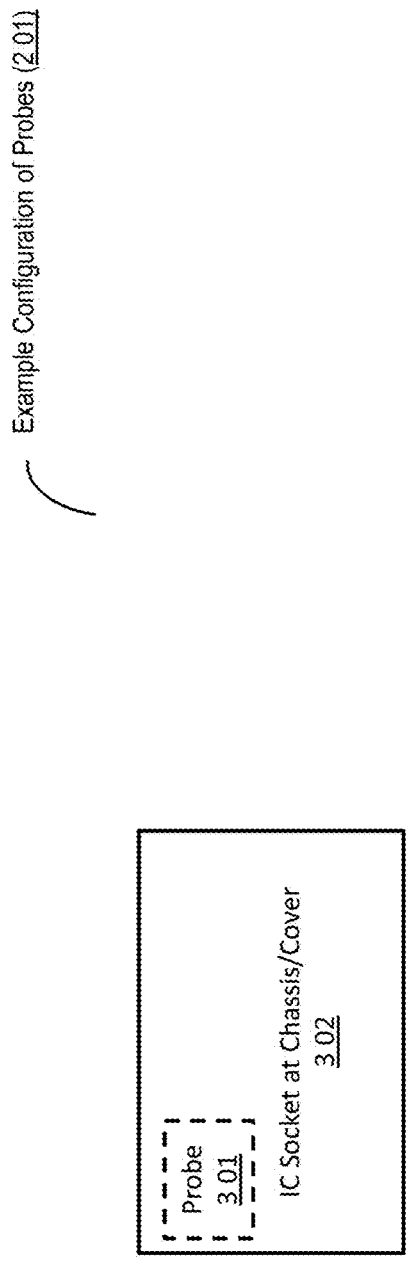
FIGS. 3A-3B provide block diagrams illustrating example configurations of probes (e.g., 201 in FIGS. 2A-2D), according to various embodiments.
Figure 3B:
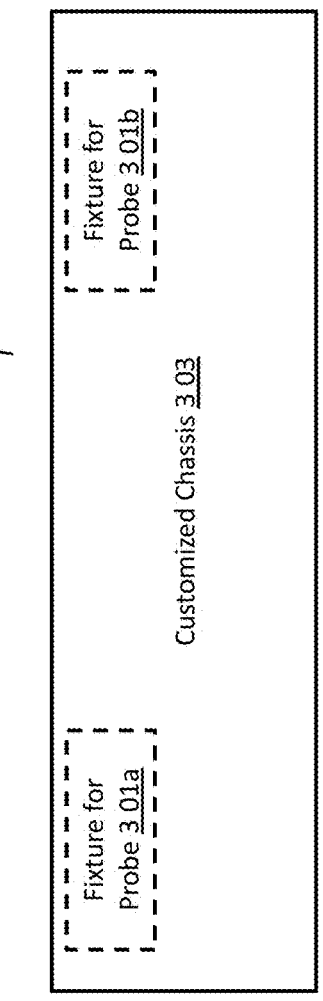

FIGS. 3A-3B provide block diagrams illustrating example configuration of probes (e.g., 201 in FIGS. 2A-2D), according to various embodiments. In the fingerprinting system as shown in FIGS. 2A-2D, an independent monitor can observe side-channels (such as temperature, power, EM emissions, circuit delay) of the target system during operation using one or more physical sensors. The captured data (traces) can be processed to extract unique signatures and fine-grained signatures and compared against stored reference data from a trusted reference, which are used to perform anomaly detection by applying signal detection and pattern recognition analysis.

For the fingerprinting system shown in FIG. 2A, the positioning of probes 201 and the consistency of this position affect the collection of usable information captured by the PFP system, as well as the noise and interference allowed to make it into the fingerprinting system. A consistent probe position throughout the life span of the monitored system reduces the variance in the assessment results. Therefore, it is desirable to provide a mechanism to consistently or permanently fix the probe on the target system to obtain the substantially exact same location relative to the target system on each capture.

As shown in FIG. 3A, for new target systems, the positioning of probes 301 can be accomplished by introducing fixtures to hold the probes in the board design, introducing the probes 301 as part of the board or system design, designing the target's chassis or covers with the fixtures to hold the probes, or other similar approaches. For example, the sensor can be included in the IC socket at the target device's chassis or cover (e.g., 302) such that the chip is mounted on the heat sink that is used to dissipate the heat of the chip.

Alternatively, for existing chassis or covers of the target devices that were not equipped with probes or the provisions to fix them, it is possible to fix the probes by permanently gluing or taping the probe to the target device. Another approach is to introduce mechanical fasteners that hold the probe in the intended location. For example, such mechanical fasteners could either attach to the chip, circuit board, or case. Yet another approach is to replace the existing chassis or cover of the target system with a custom-made chassis (e.g., 303) that is identical to the original one but includes the fixtures 301a-b for the probes 301. This latter approach can be accomplished by creating a three-dimensional (3-D) model of the original chassis (for example, by means of 3-D scanning), modifying the resulting 3-D model to add the probes or probe fixtures, and build the modified chassis (e.g. by using 3-D printing).

Figure 4:
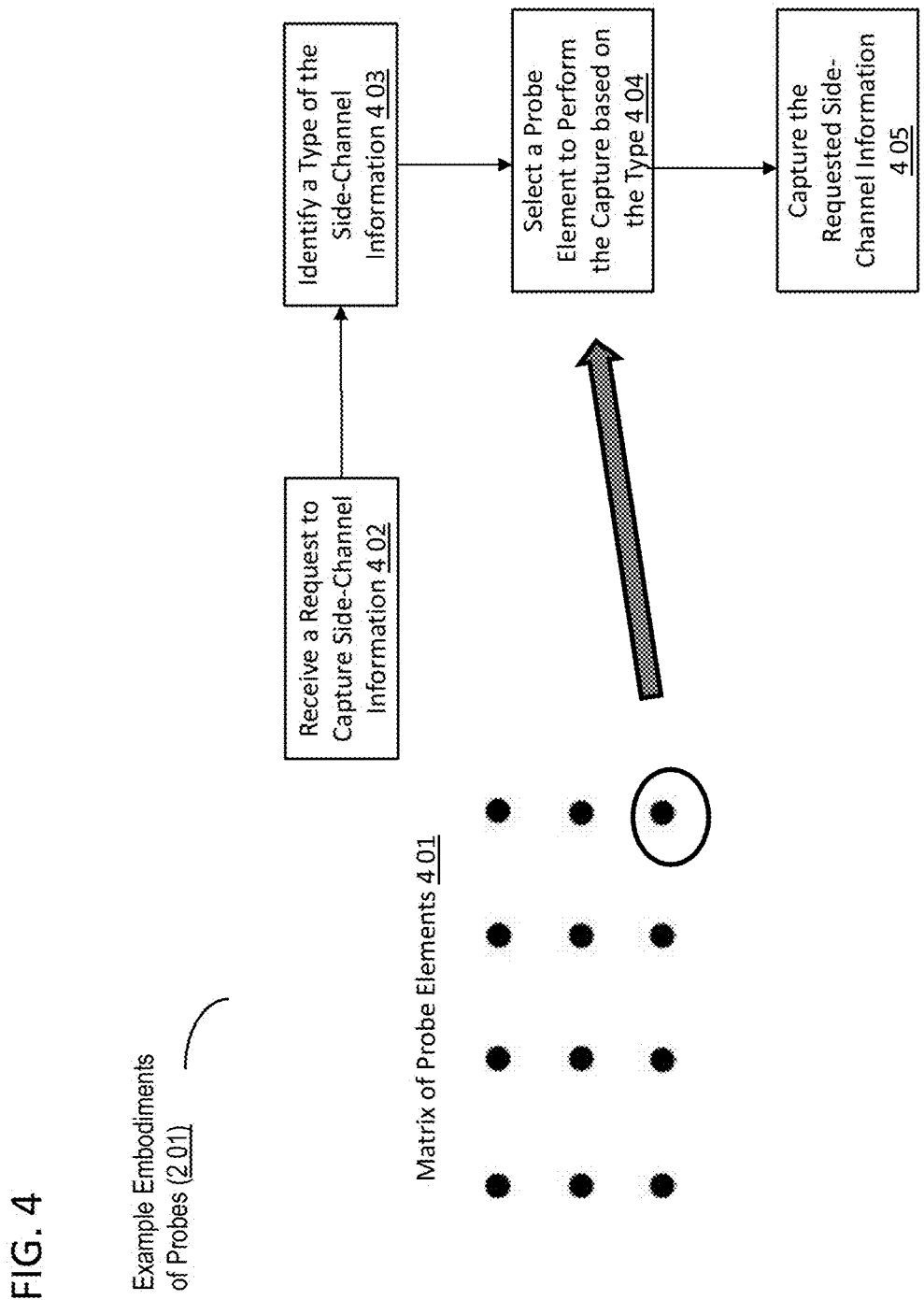
FIG. 4 provides a logic flow diagram illustrating aspects of work flows of capturing side-channel information based on a matrix of probe elements, according to an embodiment.

FIG. 4 provides a logic flow diagram illustrating aspects of work flows of capturing side-channel information based on a matrix of probe elements. For certain types of probes, it is possible to use a matrix of probe elements 401 to introduce diversity in the captured signals. The matrix of probe elements 401 also allow for flexible positioning and flexible configuration of the probes so as to enhance signal quality by increasing gain in specific spatial regions or reduce interfering signal.

In some instances, the matrix of probe elements 401 can include multiple identical elements spatially distributed, multiple different elements that allow for the capture of different signals, or elements that can be dynamically configured to form a combined probe with different characteristics.

Examples of these probe elements with a matrix 401 include electromagnetic probes configured and managed as "Smart Antennas" or "Reconfigurable Antennas" but the same principles apply to all other types of sensors. Such antennas may feed a DSP or analog-based combining/selection circuit using smart antenna algorithms (e.g., adaptive beamforming, etc.) applied in communications and radar signal processing. For example, as shown in FIG. 4, when the probes 201 (or matrix of probe elements 401) receives a request (e.g., from the fingerprinting system in FIG. 2A) to capture side-channel information at 402, the fingerprinting system may identify a type of the side-channel information desired at 403 (e.g., environment information, circuit status information, physical positioning status information, etc.), based on which the fingerprinting system can select a probe element (e.g., from the matrix of probe elements 401) at 404 to capture the requested side-channel information at 405. The fingerprinting system can also select certain probe elements as a function of time and chip activity or coherently combining probe elements to improve feature collection.

Figure 5:
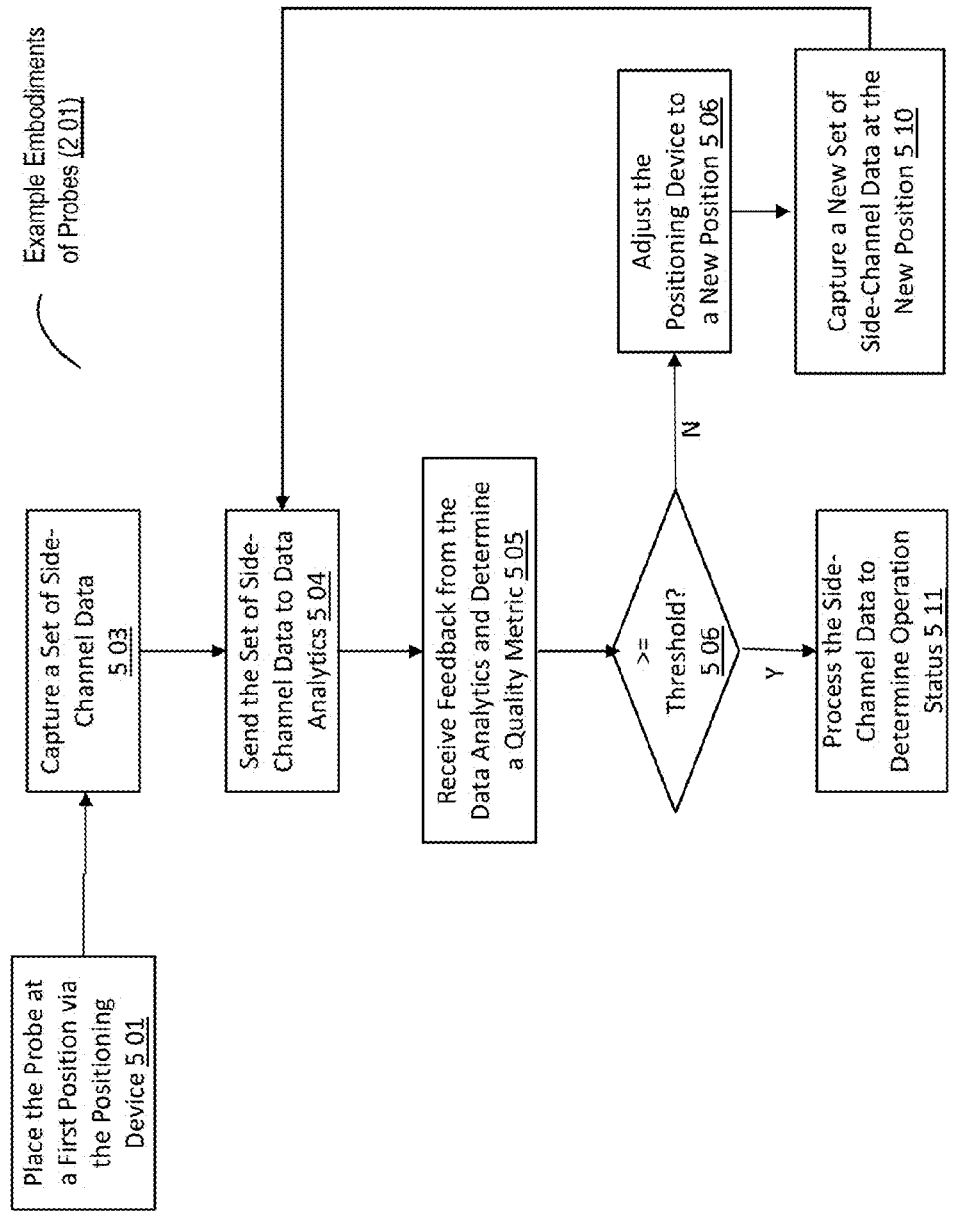
FIG. 5 provides a logic flow diagram illustrating aspects of automatic adjustment of probe positions based on feedback of side-channel collection, according to an embodiment.

FIG. 5 provides a logic flow diagram illustrating aspects of automatic adjustment of probe positions based on feedback of side-channel collection. Proper positioning of the probe can lead to better anomaly detection classification accuracy and the positioning is often driven by trial-and-error. Hence, the relative positioning of the probe and the sensor can be performed manually or automatically with a positioning device (e.g., movable table or robotic arm) with feedback from the DSP 205, or PFP analytics 206 in FIG. 2A.

As shown in FIG. 5, the fingerprinting system can place the probe at a first position (e.g., by sending instructions to a positioning device such as a mechanic arm, etc.) at 501, and then capture a set of side-channel data at the first position at 503. The captured side-channel data is sent to a data analytics module (e.g., 206 in FIG. 2A), which generates feedback that evaluates quality of the side-channel data, e.g., whether the side-channel data is consistent with previously stored data, whether captured graphical content is on-focus, and/or the like. The fingerprinting system can then determine a quality metric for the first position at 505. The metrics for the positioning arm can vary. Some examples include identifying core-instructions of the area of interest, presenting a sequence of tests for corruption of key aspects of the code execution, such as interrupts that could be used in hijacking software, code and/or hardware areas used in encryption, boot sequences, I/O ports, and others. Another metric could be, for example, the consistency of the response to the test features measure using mean-square-error, peak over root-mean-square (RMS), or the statistical variance of the features.

If the value of the quality metric is greater than a threshold at 506, the fingerprinting system can process the side-channel data to determine an operation status of the target device/system at 511 and proceed with analytics (e.g., 206 in FIG. 2A). If not exceeding the threshold at 506, the fingerprinting system can send instructions to the positioning device to adjust to a new position at 506, and continue to capture a new set of side-channel data at the new position at 510. The fingerprinting system can then repeat from 504 to evaluate the new position.

In a further implementation, signals can be introduced into the circuit for purposes of synchronizing the collection and processing of signals. Such signals may act as a way to determine the execution state that is being collected. For example, to recognize the code being executed, a spread spectrum signal can be injected into the power line to provide a pilot timing reference embedded into the collected signal. Alternatively a precise timing source, such as GPS, can be used to synchronize the execution and fingerprint processing.

In another implementation, signal injection can be used for probing the target device/system for integrity. A signal may be injected into the power line of the fingerprinting system to establish timing reference that is embedded into the collected signal. For instance, observing the power consumption spectrum when a low-level signal is introduced into a circuit path from a different location can identify non-linearities introduced by extraneous hardware. Features due to non-linearities of new circuit components added to the target device/system can be recognized using techniques for evaluating RF circuitry.

FIGS. 6A-6B provide example block diagrams illustrating work flows of an analog processing module (e.g., 202 in FIGS. 2A-2D), according to an embodiment. Processing in the analog domain can be performed on the signals (traces) captured by the probes to condition the signals and remove unwanted content.

As shown in FIG. 6A, basic analog processing includes a filter 602 and a low-noise amplifier 603 that can be arranged in a cascade configuration, or combined in a single circuit. Signals from the probe 601 are processed at the filter 602 and low-noise amplifier 603, before being transmitted to the digitizer 604. As part of the analog processing at 202, it is possible to utilize a differential amplifier in addition to 603 to reduce interference and also introduce an equalizer to compensate for signal distortion due to aging, environmental effects, and the like.

As part of analog processing 202, for another example, it is possible to enable a distributed processing approach that allows the transfer of the signals 601 from the probes with minimal degradation over extended distances by following an approach discussed U.S. Pat. No. 4,787,741, entitled "Fiber Optic Sensor," issued on Nov. 29, 1988, which is herein expressly incorporated by reference. The distributed processing approach can be similar to a technique used in cellular base stations called fiber-to-the-antenna or RF-over-Fiber. As shown in FIG. 6B, an optical modulator 605 is used to convert the captured signals 601 (after passing through the filter 602 and low-noise amplifier 603) into optical signals which are then transferred using optical fiber 606 to a remote central processing station, where the optical signals are converted back into the electrical form via an optical demodulator 607, and sent to the digitizer 604 to be digitized and processed.

The optical modulator 605 can be a direct modulator or external modulator. Furthermore, the optical modulators 605 can be absorptive or refractive, and they can leverage any of the optical modulation techniques, such as the Franz-Keldysh effect, the Quantum-confined Stark effect, excitonic absorption, changes of Fermi level, or changes of free carrier concentration for the absorptive modulators, or the electro-optic effect, acousto-optic effect, magneto-optic effect, or liquid-crystal polarization changes for refractive modulators.

As part of the analog processing 202, it is also possible to introduce some of the array processing that can be used with probes with multiple element arrays. For example, analog phase/weighting can be applied to the signal 601 from the probe sensors to reduce the noise or eliminate irrelevant background features in the side channel signal (PFP signals or traces).

In a further implementation, additional analog approaches may be used to reduce the sampling rate. For example, a channelization of the signals into different bands can be accomplished using techniques such a filter bank or an analog FFT. An analog chirp transform, similar to that used in analog spectrum analyzers can be used to sweep through the band, extracting a subset of the band as a moving window of frequency.

FIG. 7A provides an example data plot diagram illustrating example spectrogram from the analytics module (e.g., 206/214 in FIG. 2A), according to an embodiment. The PFP analytics 206 (or analytics 214) can include a feature extraction approach that combines information from the time and frequency domain, which uses a difference of means (DoM) on the periodogram of a PFP signal. Once PFP signals (traces) are captured, the spectrogram is calculated to extract its frequency components at different time segments. The spectrogram is the magnitude squared of the Discrete-Time Short-Time Fourier Transform (STFT), $X(\tau, \omega)$, as described below:

$$\text{spectrogram}\{x(t)\}(\tau, \omega) = |X(\tau, \omega)|^2$$

where $$X(m, \omega) = \sum_{n=-\infty}^{\infty} x[n]w[n-m]e^{-j\omega n}$$

where, $x[n]$ is the captured PFP trace and $w[n]$ is a window function, such as the Hann window, the Gaussian window, Hamming window, Bartlett window, etc. For example, an illustrative time-frequency space is shown in FIG. 7A. The spectrogram 701 provides a two-dimensional representation of the PFP trace based on time 703 and frequency 702. This view provides information about the frequency content over time of the PFP trace.

The actual feature used for PFP analysis 206 is the smoothed difference between the spectrogram of the captured signal (which can be the average of multiple captures) and a baseline reference. There can be multiple baseline references for the target device representing authorized execution. Furthermore, the baseline references can cover the full time-frequency space, or only a selected number of time-frequency bins. In addition, the processing parameters for the feature extraction, such as time base and frequency resolution of the spectrogram, overlap, window function, smoothing window, etc., can be same for all the baseline references or can vary among references or even within the same reference. The specific parameters used for the spectrogram difference of means (DoM) analysis are determined during the characterization process. The time evolution of the spectrogram's characteristics also represents a feature that can be used in the subsequent decision process (e.g., see 206b in FIG. 2A).

Figure 7B:
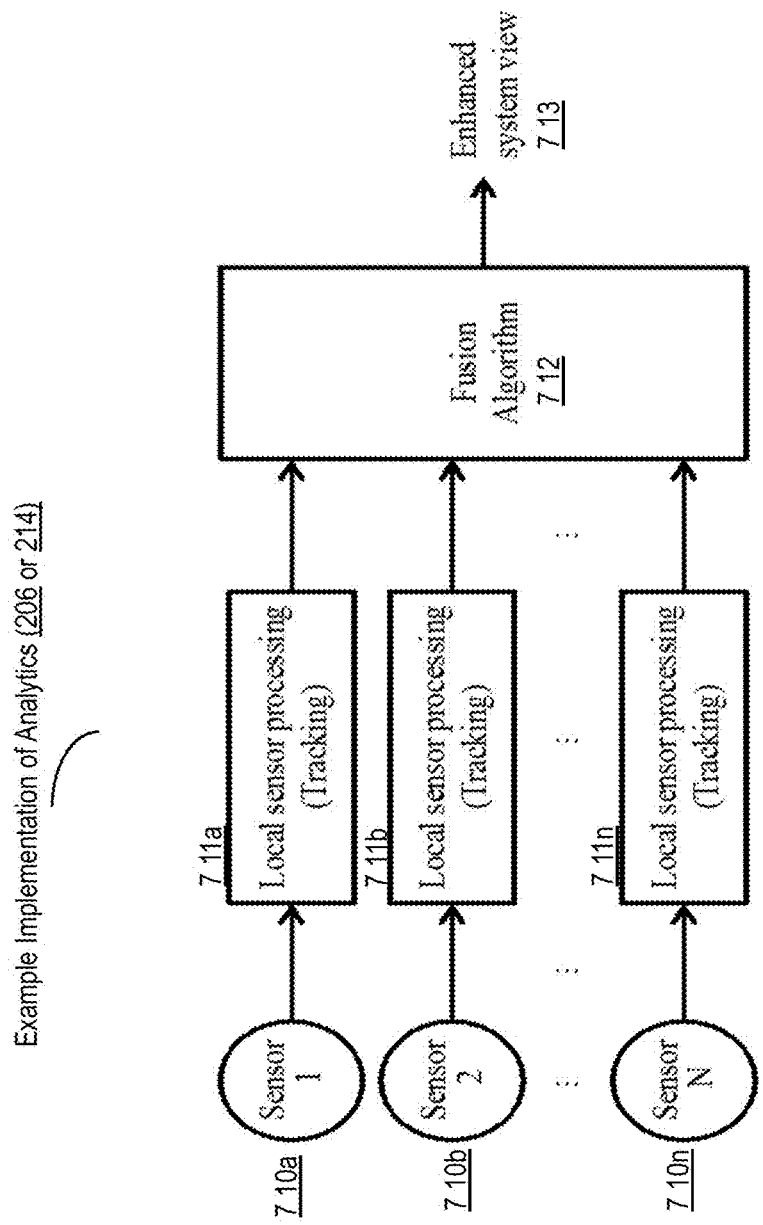
FIGS. 7B-7D provide block diagrams illustrating example infrastructures of the analytics module (e.g., 214 in FIG. 2A), according to an embodiment.
Figure 7C:
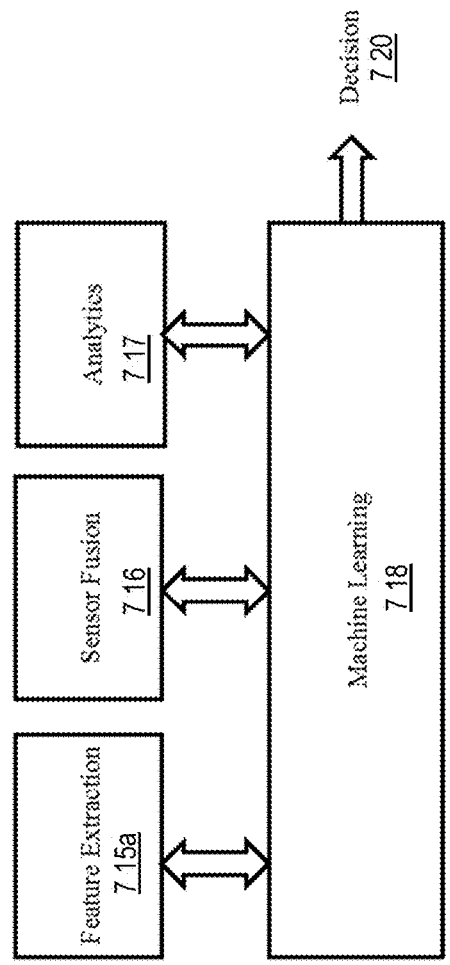
Figure 7D:
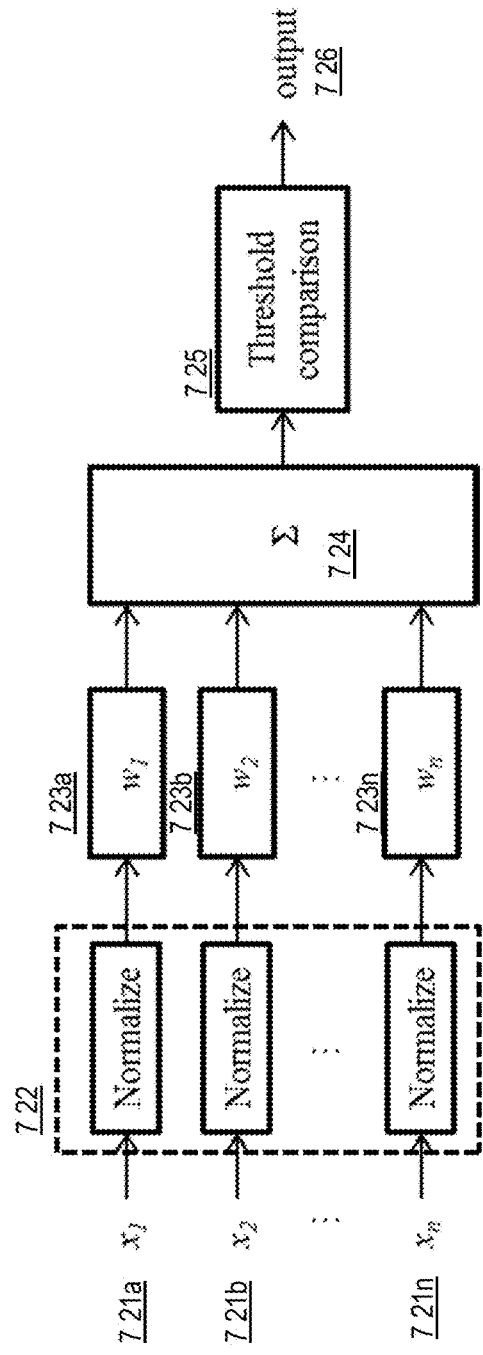

FIGS. 7B-7D provide block diagrams illustrating example infrastructures of the analytics module (e.g., 214 in FIG. 2A). An example implementation of analytics 206 or 214 in FIG. 2A can include a sensor fusion engine at which the PFP system combines captured data or extracted features from different sources and probes to improve the assessment results. The different inputs for the sensor fusion include all different side-channel probe sensors 710a-n, including but not limited to: latency, heat, physical state (e.g. position of robotic arm), and more.

The sensor fusion algorithms 712 can be adaptive to attempt to optimize a specific metric, which can include, for example: probability of false alarm, probability of detection, mean-time of decision. It can also be adaptive to compensate for ageing of the target device and the probe sensors 710a-n. Inputs to the sensor fusion engine (e.g., local sensor processing 711a-n) can also come from different subsystems, including those that are independent of PFP, such as other intrusion detection and security approaches such as anomalous data/network traffic, user behavior (such as missed passwords or inconsistent keyboard activities), uncommon program execution paths, access to protected registers and memory, and others. The fusion is not limited to physical sensors and can also include data and signals directly from the target system when available, including triggers from memory pointers, signals from the chip, the operating system, or application.

The sensor fusion engine (e.g., the local sensor processing 711a-n) can improve the performance of the PFP assessment by combining the inputs from different sensors, capturing different information from the target. For example, one PFP probe sensor (e.g., 710a) can provide excellent information for discriminating between different executions (effective intrusion detection) but only provide limited information for timing estimation and synchronization, while another sensor (e.g., 710b, ... 710n) can provide excellent synchronization information but poor execution discriminatory information. Combining the signals from those probe sensors 710a-710n from the local sensor processing 711a-n can improve the accuracy of timing estimation with little degradation to discriminatory information. Another example includes sensors that excel at different types of execution discrimination such as, regular CPU execution, interrupt execution, memory access, communication, peripheral etc. Combining these probe sensors at the fusion algorithm implementation 712 can provide an enhanced system view 713 of the target execution. Additional example approaches to implement the fusion algorithm 712, include but are not limited to: Kalman filters, particle filters, complementary filters, Bayesian networks, and/or the like.

FIG. 7C shows another example implementation of the PFP analytics 206 or 214 in FIG. 2A. The PFP analytics 206 or 214 can discover meaningful patterns in side-channels and related data as well as finding correlations between events, and between PFP and other sensors. The analytics 206 or 214 generates and applies descriptive and predictive models to identify and extract valuable knowledge from side-channels and related data. Examples of implementation of the analytics module 206 or 214 can be found in Hadoop® and other open source data analytics program.

The PFP analytics 206 or 214 can also include a feature extraction block 715a that identifies the features that carry the most discriminatory or useful information (or features that carry more discriminatory or useful information than for other features). Such reduction in features helps reduce the processing load used to monitor a given target device using side-channels and also allows for faster assessments and for the implementation of side-channels on platforms with reduced computational capabilities.

As another example, machine learning 718 identifies and updates the key features. Machine learning 718 allows the PFP analytics 206 or 214 to be updated on a continuous (or near continuous) basis when allowed. The machine learning 718 can communicate with the sensor fusion module 716 as discussed in FIG. 7B, the feature extraction module 715a, and a sub-module for analytics 717. The sub-module for analytics can analyze collected side-channel data to recognize the execution of key instructions or program segments, for example interrupts. Interrupts can cause timing jitter of the expected side channel response, e.g., memory refreshing. In this case, the response of the side channel can be compensated for by determining if an anomaly has occurred, for instance, by ignoring the features of the interrupt. Also recognizing deviations in execution of types of interrupts is desirable because many cyber attacks co-op the execution of interrupts. Recognition of other key instructions out of context of their normal execution can be a significant indicator of malware. As another example, monitoring of the power consumption characteristics along with identification of code segments can aid in developing code that minimizes power consumption. Code segments that are identified as producing power consumption can be reformulated to better improve power consumption of the device. Timing for interpreting the code segment being executed can be accomplished by an external timing source. A time stamp from this source can be sent along with the collected signal for subsequent processing.

In another implementation, the analytics module 206 or 214 can include a control engine (not shown in FIG. 7C), which adapts sampling rate and/or statistics, changes signal conditioning (such as power conditioning as one example)/equalization, and coordinates with power consumption control mechanisms at the system and chip level. The control engine can also control updating the trusted side-channel references. Because the control engine can be integrated with the decision module (e.g., 206b in FIG. 2A), the control engine is also in a position to trigger a specific action as a response of an integrity violation or disruption. The control engine is also in charge of evaluating policies for response or updates.

FIG. 7D provides another example implementation of the analytics module 206 or 214, or the decision module 206b. As shown in FIG. 7D, the decision module 206b includes a set of devices 722 to normalize signals such as automatic gain control (AGC) devices, a set of devices 723a-732n to weight signals such as multipliers, an summer 724 and one or more detectors 725 that perform a threshold comparison for the added signal. The appropriate detectors 725 can detect, for example, for the different discriminatory features and makes the final assessment of whether a specific trace should be considered normal, anomalous, or malicious.

The operation of the decision module 206b depends on the number and nature of discriminatory features available. For example, for a one-dimensional discriminatory feature, the decision module 206b can use a single binary detector (e.g., detector 725) such as a detector using the Neyman-Pearson criterion to determine whether the observed feature corresponds to authorized execution or not. In the case of multidimensional features, the features and individual decision are combined to provide a final assessment. There are multiple options for combining the features, with the selection depending on the nature of the features and the target systems. The combining options for detection includes, but is not limited to, linear combining of features $(x_1 \ldots x_n)$ 721a-n, that are normalized at the set of devices 722 (e.g., AGC devices) and weighted by weighing factors $(w_1 \ldots w_n)$ at multipliers 723a-n, and summer 724. The weighted sum produced by summer 724 is then compared with a threshold by detector 725, to make a decision output 726. The weights $(w_1 \ldots w_n)$ for each feature can be dynamic, determined by the amount of useful information contained. In another approach, individual detectors exist for each feature and then the detector output are combined using majority voting for a final decision.

The decision module 206b can base its assessment on a white list, a black list, or a combination of both. In the white list approach, the decision module 206b detects anomalies from a set of trusted authorized references obtained from the execution that is expected to take place. In the black list approach, references of the malicious or other execution specifically deemed as unauthorized are used. These two approaches are not mutually exclusive and can be combined in the same PFP system when the appropriate references are available.

The sensitivity of the detectors of the decision module 206b can be defined by a user, who can select the levels at which to raise an alarm and also the action that is expected to be triggered in the event of an integrity violation is detected. The sensitivity may also depend on the circumstances, i.e., high-threat level might trigger a higher sensitivity level. Because a deviation from the expected traces can be the result from a number of environmental conditions, including target device failures, and not only malicious execution, the decision module 206b is charge of making the distinction when possible. For example, when the anomaly is the result of a power failure, or when a strong external signal is jamming the power sensors. Deviant features may be classified as anomalies due to security intrusions or the features may be classified as hardware errors, hardware aging, or incorrect software running on the platform.

Figure 8:
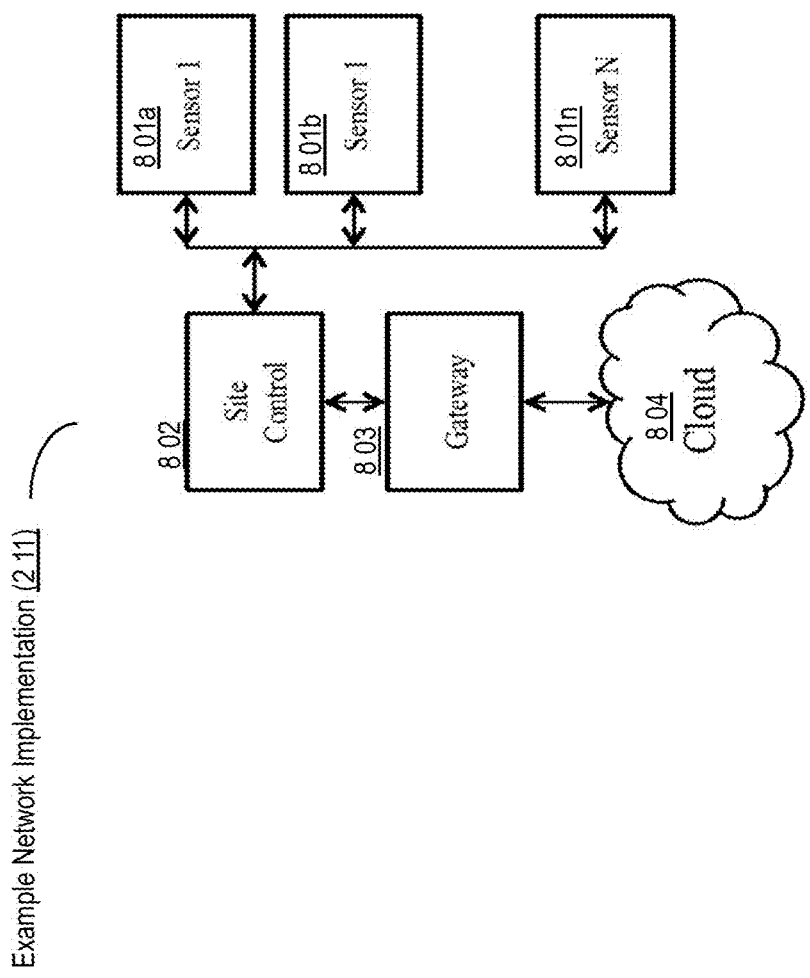
FIG. 8 provides a block diagram illustrating example infrastructure of the network implementation module (e.g., 211 in FIG. 2A), according to an embodiment.

FIG. 8 provides a block diagram illustrating example infrastructure of the network implementation module (e.g., 211 in FIG. 2A), according to an embodiment. The network 211 in the fingerprinting system represents a local or private communications network and its interface. It can be an optional element that brings flexibility and scalability for monitoring. This network 211 can be shared or separated between application and side-channel related data. The network 211 can be operated based on TCP/IP networks, with actual network requirements necessary to support assessment depending on the target platforms, feature extraction techniques, among other elements. For example, multiple side-channel monitors/probe sensors 801a-n are connected together and monitor multiple targets via a site control 802. The monitored information can then be passed on via a gateway 803 to a data cloud 804 (equivalent to 213 in FIG. 2A). The network 211 also helps delivering the necessary updates and control information to the different monitors 701a-n within a user's domain.

Figure 9:
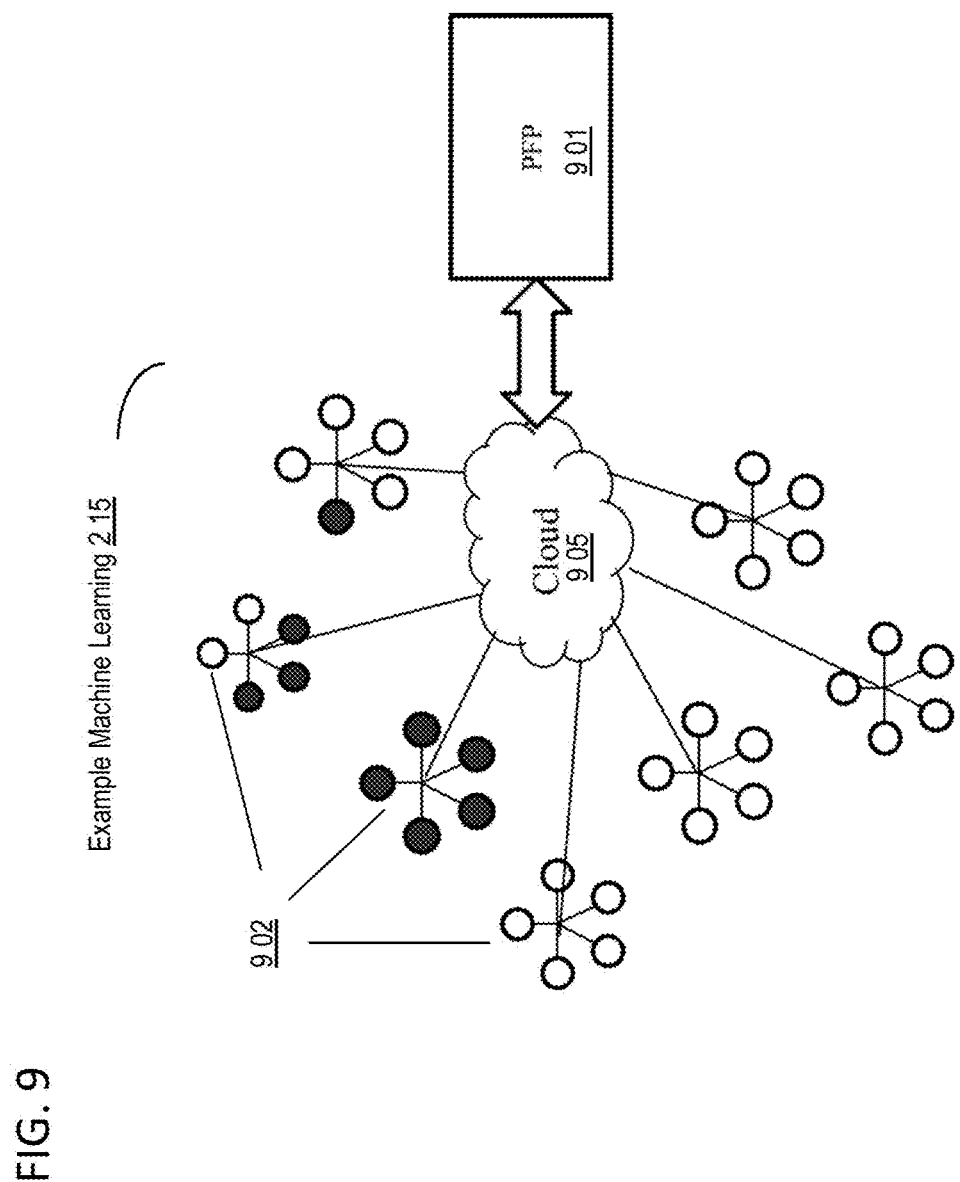
FIG. 9 provides a block diagram illustrating an example of a user case by a machine learning module (e.g., 215 in FIG. 2A), according to an embodiment.

FIG. 9 provides a block diagram illustrating an example of a use case by a machine learning module (e.g., 215 in FIG. 2A), according to an embodiment. Machine learning can be used to track the evolution and migration of specific threats or attacks through the processing chain or an industry as a whole. This process is shown in FIG. 9, in which separate networked nodes 902 that are interconnected are infected or tampered (shown in FIG. 9 as the nodes with darkened circles). The learning process can be implemented with a number of different artificial intelligence (AI) techniques including fuzzy logic or case-based reasoning. Monitoring by the machine learning module can detect the attacks and keep track of geographic distribution of compromised nodes 902. Furthermore, the machine learning module can use its analytics engines to gain insight into what elements contribute to the intrusion and predict spread patterns, attacker intentions, and possible mitigation, and such analytics data can be stored at the cloud 905, which can be shared with a PFP system 901. As an example, this approach could be used to spot the spread of malware from a software update for a class of devices.

Figure 10:
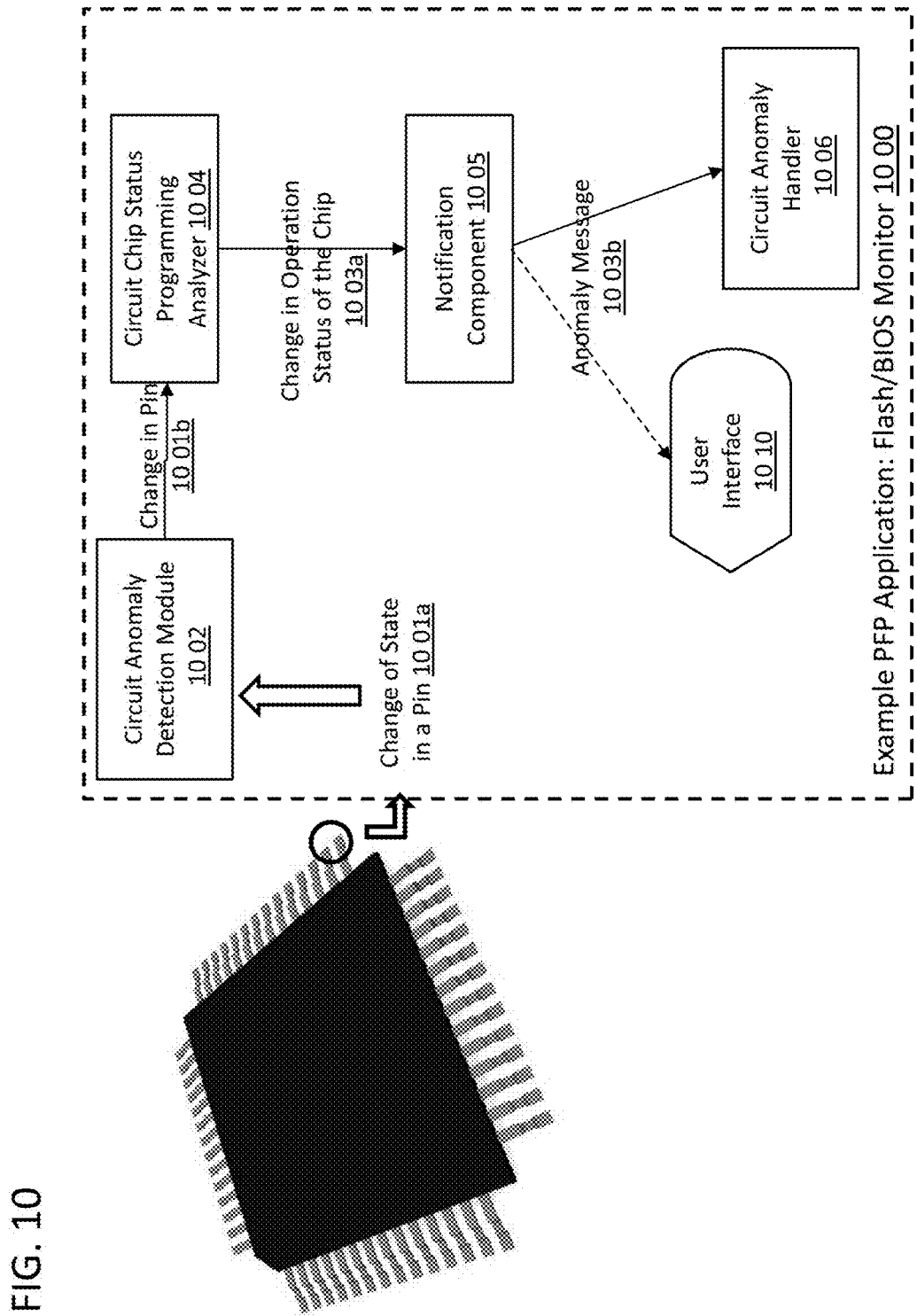
FIG. 10 provides a block diagram illustrating aspects of an example PFP application to monitor a flash or basic input/output system (BIOS), according to an embodiment.

FIG. 10 provides a block diagram illustrating aspects of an example PFP application 1000 to monitor a flash memory, a field programmable gate array (FPGA) or a BIOS. The PFP application 1000 can include a circuit anomaly detection module 1002, circuit chip status programming analyzer 1004, notification component 1005, user interface 1010 and circuit anomaly handler 1006. An EM sensor or a direct circuit connection is used for monitoring a change of state in the pin on the chip 1001a that enables flash memory to be reprogrammed or for enabling the FPGA or the BIOS to be reprogrammed. This circuit that monitors for a state change 1001a passes that information to the circuit anomaly detection module 1002. The circuit chip status programming analyzer 1004, upon receiving information of a change in the pin at 1001b, can determine a change in operation status of the chip and a send a signal at 1003a, to update the notification component 1005. Thus, the notification component 1005 notifies a user through an interface 1010 and/or sends a message 1003b to a circuit anomaly handler 1006 that is responsible for executing a response to a possible intrusion.

Note that such a PFP application can be performed at particular time or repeated at several times over the operating life of a target device (e.g., a target circuit chip including a reprogrammable component, or a target device having software and/or firmware). For example, a PFP application can monitor a target device from its initial manufacture, through use and until the target device ceases to operate (i.e., from "cradle to grave"). For another example, a PFP application can monitor a target device over a shorter period of time such as an operational period such as a day, a week, a month, a year or multiple years. In either case, a PFP application can collect information about the target device at multiple distinct and separate times over an extended period of time. By monitoring and conducting a power analysis of a target device, the time-related performance of the target device can be tracked. Other similar devices can be similarly measured at corresponding times during their life cycles and compared to the information collected for the original/control target device. In instances where the target device is or includes a reprogrammable component (e.g., a reprogrammable component on a target device), then the programming changes (in addition to or in the alternative to any other time-related changes) to the reprogrammable component can be tracked. Based on such monitoring/tracking, the performance, history, integrity and/or operation can be assessed.

For yet another example, a PFP application can monitor a target component or target device over an extended period of time through various configurations, locations and installations. Such a target component/device can, for example, start as a target circuit chip including a reprogrammable component that is initially manufactured, and then installed in a printed circuit board assembly (PCBA) that can include firmware and/or an FPGA; the PCBA can then be installed in a storage device, which can in turn be transported by one vehicle and installed on another vehicle. In such a life cycle example, a PFP application can monitor and assess the target device at each stage mentioned above. This can allow, for example, a life cycle monitoring through all phases of the target component/device.

FIG. 11 provides a block diagram illustrating aspects of an example PFP application in foundry and counterfeit identification 1100. The fingerprinting system (e.g., any of the PFP systems shown in FIGS. 2A-2D) can be used to determine the manufacturing origin of devices or if such devices may be counterfeited. This can be accomplished by matching the features extracted using simulation or emulation of the specific technology libraries used at the foundry or origin. As shown in FIG. 11, to determine manufacturing information, including foundry of origin 1124, foundry geographical information 1122, age of the device, and devices with shared origin 1123, a set of crafted test vectors 1111 can be defined by the PFP system to help identify the authenticity of the device under test (e.g., a chip or IC). The test vectors 1111 are then send from the PFP system to a device under test (DUT) 1115, which causes device state information 116 to be generated and sent to the PFP system. The generated device state information 1116 is used by the PFP system for feature extraction and statistical analysis at 1117, which can generate detailed feature analysis 1118, outlier detection 1119, white listing 1120, and/or the like. The generated data from 1118-1120 can be stored at a known foundry database 1121. This process might be performed, for example, as a test fixture or for one chip to validate another interconnecting chip, using a standard chip tester. Additionally, this process can be performed, for example, as a chip-to-chip authentication, where challenge response is made from one chip in the circuit to another chip in the circuit.

Figure 12A:
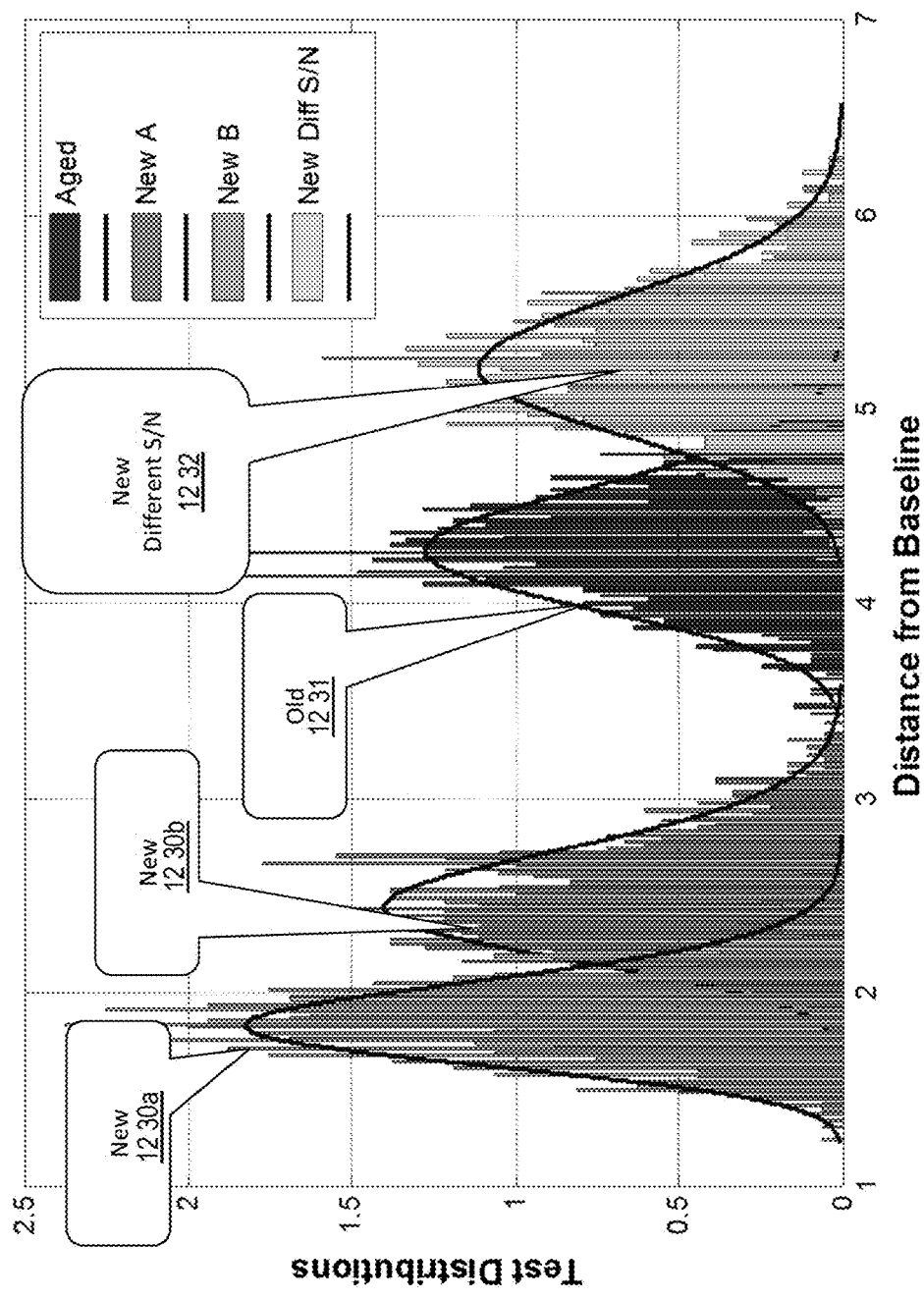
FIGS. 12A-12B provide example data plot diagrams illustrating an example of counterfeit measurements, according to an embodiment.
Figure 12B:
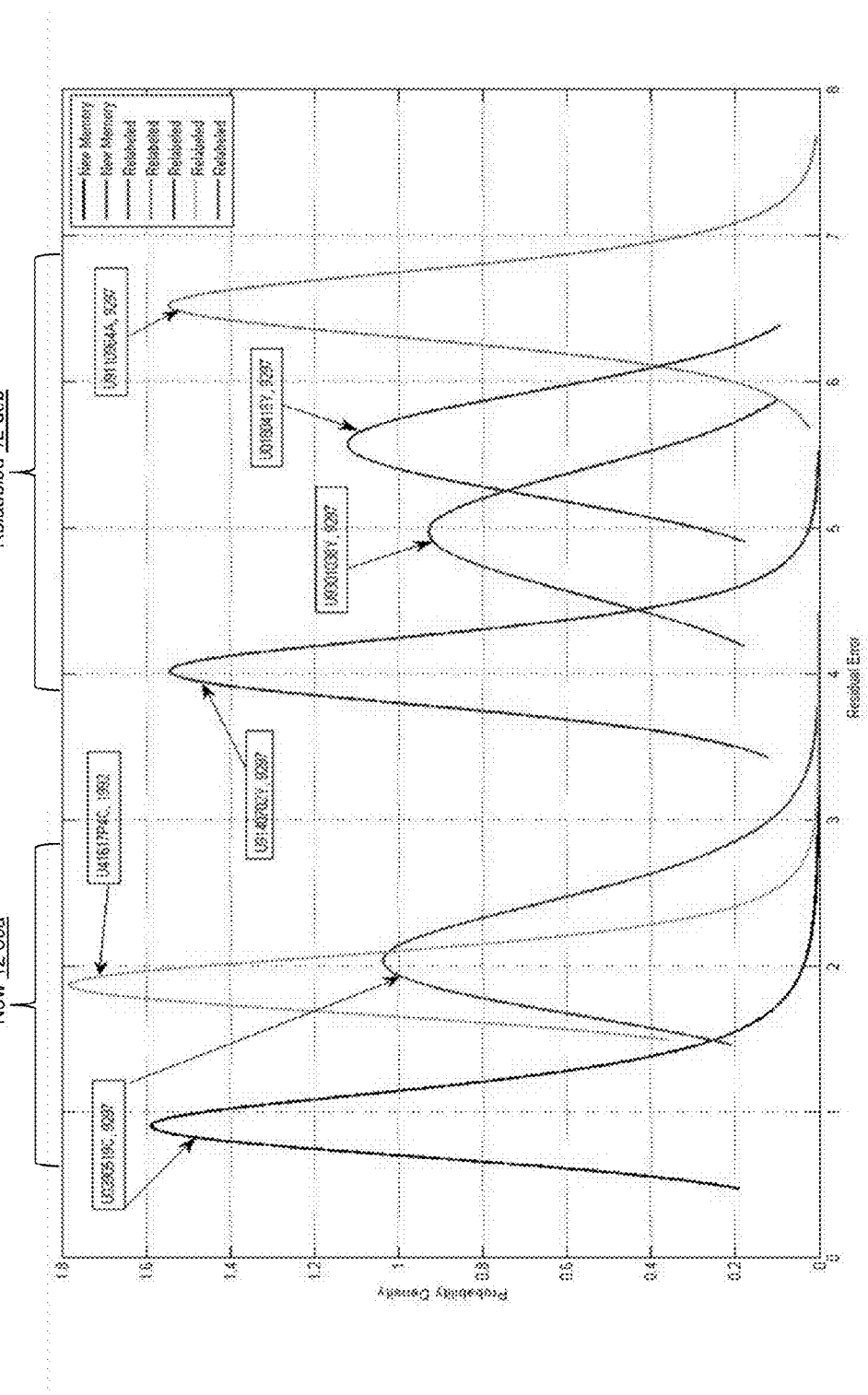

FIGS. 12A-12B provide example data plot diagrams illustrating an example of counterfeit measurements, according to an embodiment. As shown in FIG. 12A, an example of counterfeit measurements of Intel TB28F400B5-T80 memory chips (e.g., 1230a-b, 1232) is provided, some of which are old relabeled chips 1231. Here the featured extraction and statistical analysis (1117) results in a measured probability distribution function (pdf) of error deviation measured with respect to the baseline signature (not shown) is presented on the x-axis (labeled as "Distance from Baseline") and the y-axis represents the probability of the error measurement from baseline.

In another example shown in FIG. 12B, new 1250*a* and aged 1250*b* FPGA Xilinx Spartan 3's (Xilinx XC3S500E FPGA) are analyzed. Again, the error of the power-consumption characteristics (labeled on the x-axis as "Residual Error" and similar to the distance from baseline shown in FIG. 12A) is used to construct a probability distribution function. A variety of statistical tests can be then applied to make a final decision of which are counterfeit parts (aged and relabeled components) and which ones are the valid parts. The graph to the far right is a device with a different serial number (S/N) but has equivalent functionality and is representative of a counterfeit device.

Further examples of applications of the fingerprinting system can include a USB and other plug and play devices. When a device in connected to a computing device, a protocol is followed that identifies and establishes the context of the connection. USB memory devices or printers preform well-defined procedures to establish the context of this connection. Side-channels such as power fingerprinting or response times for this protocol exchange can be monitored for anomalous behavior indicative of malware or hardware Trojans.

Additional examples of fingerprinting system applications can include monitoring of side-channel anomalous behavior of target systems and detect malicious intrusions in a number of different applications, including but not limited to: semiconductor, mobile, supply chain, foundry of origin identification, SCADA and industrial control, networking, FPGA security, memories, Internet of things, embedded system security, Linux, virtualization, server farms, trust for plug-in devices, forensics, transportation systems, and/or the like. For example, the PFP can be implemented with a program that runs on the device under test that exercises key hardware components while queuing the fingerprinting system on which hardware components are being tested. For another example, a procedure can be implemented on a target device/system for identifying a fuzzying attack by examining anomalous side-channel behavior referenced to a baseline norm extracted from valid input data to the fingerprinting system.

Further implementations of the PFP system may include: a method for detecting unauthorized modifications and other tampering in software, firmware, and hardware introduced by untrusted links in the supply chain can include the application of a PFP analysis in an integrity lab for incoming devices or on the field for deployed devices; a method for responding to malicious intrusions, tampering or unauthorized modifications detected by a PFP monitor can include at least one of: warning, logging, and reporting the event; preventing access to certain critical resources to prevent the target system being protected from being damaged, exploited, or its information from being leaked; gathering intelligence and forensic information from the attack or attackers; temporarily disabling the affected device by shutting down, or resetting or preventing operation/computation; or permanently disabling the affected device by physically damaging or destroying the device.

The following provides some examples of where the PFP system can be used to detect an anomaly and assess the trustworthiness of a target device or system. For example, the PFP system can used to detect an anomaly within and assess the overall trustworthiness of an autonomous system such as a driverless car, an unmanned autonomous vehicle (UAV), an appliance (e.g., a household appliance such as a refrigerator), a device within the Internet of Things (IoT), a wearable device (e.g., an exercise monitoring device). For such autonomous systems, the PFP system allows for remote analysis, anomaly detection and/or trustworthiness assessment when access is not practical. For other examples, the PFP system can be used to detect an anomaly within and assess the overall trustworthiness of (1) a hypervisor used within a virtual environment of a compute device such as a server, (2) a software execution sequence, (3) an incident command system (ICS), and (4) component within a data center such as servers, switches, etc. The PFP system can also be used with humans based on, for example, a power analysis of the power characteristics or parameters included with brain waves.

In another example, the PFP system can be used in connection with installing, uploading and/or executing a software and/or firmware patch(es) (a piece of software designed to update the software/firmware or its supporting data, to fix it or improve it). The PFP system can establish a baseline(s) by installing or uploading the patch on the relevant device and collecting power characteristics/information resulting from such installation or upload. The baseline(s) can be stored, for example, in a database for future access and comparison. The PFP system can collect power characteristics/information during installation, upload and/or execution of the patch on a target device. A comparison can be subsequently performed, comparing the relevant baseline to the power characteristics/information for the target device during installation, upload and/or execution. Depending on the comparison, a determination and a notification can be made as to whether the patch is an authorized version or whether the patch is an unauthorized, tampered or malicious version.

Such analysis of firmware can be performed in other contexts and use cases. For example, the power characteristics of firmware can be analyzed to verify the content of a memory. Such a memory can be, for example, the memory at a central processing unit (CPU) or at a memory physically separate from and distinct from the CPU. The PFP system can monitor the power consumption of such a memory as the memory cycles through its operation. In the example, where the PFP system is monitoring a memory within the CPU, the power characteristics of the CPU its can be monitored as the memory cycles through its operation to derive the power characteristics of the memory.

A relatively low sample rate can be used to alias the information collected by the PFP system because the PFP system need not reproduce the information stored in the memory, but rather collect enough power characteristic information for the memory to determine whether anomaly is present. In other words, the sample rate can be selected to be sufficient to collect enough power characteristic information for the memory to determine whether anomaly is present but not so high as to reproduce the information stored in the memory. This can allow for the analysis of the memory without accessing private information stored in the memory or accessing possible priority code of the memory. The operation of the PFP system can be synchronized with the operation of the memory, for example, based on the read operations of the memory.

A further implementation of the PFP system includes a method for PFP characterization and fingerprint reference extraction and validation that enables more effective characterization or enables characterization of targets in difficult or challenging circumstances can include at least one: using simulation to get the power consumption of a device; using statistical analysis to identify outliers; using reverse engineering to validate fingerprints from hardware.

In yet another implementation, the PFP system can identify or predict the identity of a specific target device, the identity of a specific user of a target device, and/or a specific manufacturing process used to make a target device.

Yet a further implementation of the PFP system includes a method for PFP characterization and fingerprint reference extraction and validation for passive target components themselves or passive components within a target system. Such passive components can include, for example, capacitors, resistors, magnetic (inductive devices) (e.g., inductors), and transducers. For a target component or target device including a passive component, an active component (e.g., diodes, transistors, integrated circuits, or optoelectronic devices) may not be included. In such applications, the input or input vectors can be a current, voltage or signal appropriate for that passive component. For example, a method for PFP characterization may involve applying a range of different input currents; the resulting power-related behavior of the capacitor can be used to extract a fingerprint reference and/or validate the passive target component as authorized or unauthorized/tampered. Note that this implementation of the PFP system with respect to passive components can be performed with respect to a target device having only passive components or a target device having a combination of passive components and active components. (Other implementations of the PFP system described elsewhere can be used for a target device having only active components.)

Note that evaluation of power characteristics information described here can be evaluated in conjunction with other information unrelated to the power characteristics in the broader context of an overall analytics. Such other information unrelated to the power characteristics can include, for example, information associated with other sensors, information associated with other communication devices, information on the context of the target device, information on the location of the target device, information on the behavior of the target device, and/or information on the timing or sequence of the operation of the target device. Such power characteristics information and other information unrelated to the power characteristics can be analyzed as received (e.g., substantially in real-time), or stored and then analyzed at a later time.

In some embodiments, a processor-implemented method includes obtaining a request to capture a set of side-channel information; sending a signal to cause a probe component to capture a set of side-channel information relating to an operation status of a target device during operation of the target device; receiving, from an external timing source, an indication including a timestamp indicating a timing reference relating to the operation status of the target device; associating the set of side-channel information with the operation status of the target device based on the timestamp; and sending, to a data storage element, the set of side-channel information that is associated with the operation status of the target device at the timestamp. The external timing source can include, for example, a global positioning system (GPS) that is used to synchronize the operation status of the target device and that is used to capture of the set of side-channel information. The indication can include, for example, a spread spectrum signal that is injected into a power line connected with the target device, and that provides the timing reference.

It is intended that the systems and methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:
1. An apparatus, comprising:
a data storage device; and
a processor operatively coupled to the data storage device, the processor configured to receive a set of side-channel data representing a power signature of a target device, the set of side-channel data being captured by a probe disposed proximate to the target device,
the processor configured to extract a first characteristic of the set of side-channel data;
the processor configured to receive, at a first time, a first set of reference side-channel data of a reference device, the first set of reference side-channel data having a second characteristic and representing a first reference power signature of the reference device, the processor configured to compare the first characteristic of the target device and the second characteristic of the reference device to determine a first anomaly of the target device, the processor configured to receive, at a second time after the first time, a second set of reference side-channel data of the reference device, the second set of reference side-channel data having a third characteristic and representing a second reference power signature of the reference device, the processor configured to compare the first characteristic of the target device and the third characteristic of the reference device to determine a second anomaly of the target device, the processor configured to send a signal indicating the change from the first anomaly to the second anomaly of the target device.

2. The apparatus of claim 1, wherein the processor is configured to receive the first set of reference side-channel data of the reference device that has been determined via simulating the target device in a software program.

3. The apparatus of claim 1, wherein the reference device represents an emulation of the target device, the reference device configured to execute a code to determine the first set of reference side-channel data, the code being substantially similar to a code executed on the target device.

4. The apparatus of claim 1, wherein:
the processor is configured to receive a plurality of sets of reference side-channel data of the reference device via machine learning and including the first set of reference side-channel data and the second set of reference side-channel data, the plurality of sets of reference side-channel data representing a plurality of reference power signatures of the reference device that includes the first reference power signature and the second reference power signature of the reference device.

5. The apparatus of claim 1, wherein the processor is configured to track geographical migration of the first anomaly from the target device to a plurality of devices that are operatively coupled to the target device via a network.

6. The apparatus of claim 1, wherein the first anomaly of the target device represents an anomaly of manufacturing origin of the target device.

7. The apparatus of claim 1, wherein the first anomaly of the target device represents the target device being a counterfeit.

8. A method, comprising:
receiving, at a first time, a first set of reference side-channel data of a reference device, the first set of reference side-channel data having a first reference characteristic and representing a first reference power signature of the reference device;

receiving, at a second time after the first time, a second set of reference side-channel data of the reference device, the second set of reference side-channel data having a second reference characteristic and representing a second reference power signature of the reference device;

receiving, at a third time after the second time, a set of side-channel data representing a power signature of a target device, the set of side-channel data being captured by a probe disposed proximate to the target device;

extracting a characteristic of the set of side-channel data of the target device;

comparing the characteristic of the target device with the first reference characteristic of the reference device to determine a first anomaly of the target device;

comparing the characteristic of the target device with the second reference characteristic of the reference device to determine a second anomaly of the target device; and sending a signal indicating the change from the first anomaly to the second anomaly of the target device.

9. The method of claim 8, wherein the first set of reference side-channel data of the reference device is determined via simulating the target device in a software program.

10. The method of claim 8, wherein the reference device represents an emulation of the target device, the reference device configured to execute a code to determine the first set of reference side-channel data, the code being substantially similar to a code executed on the target device.

11. The method of claim 8, further comprising:
receiving a plurality of sets of reference side-channel data of the reference device via machine learning and including the first set of reference side-channel data and the second set of reference side-channel data, the plurality of set of reference side-channel data representing a plurality of reference power signatures of the reference device that includes the first reference power signature and the second reference power signature of the reference device.

12. The method of claim 8, further comprising:
tracking geographical migration of the first anomaly from the target device to a plurality of devices that are operatively coupled to the target device via a network.

13. The method of claim 8, wherein the first anomaly of the target device represents an anomaly of manufacturing origin of the target device.

14. The method of claim 8, wherein the first anomaly of the target device represents the target device being a counterfeit.

15. An apparatus, comprising:
a data storage device; and
a processor operatively coupled to the data storage device, the processor configured to receive a first set of side-channel data representing a power signature of a first target device and being captured by a probe disposed proximate to the first target device, the processor configured to be operatively coupled to the first target device via a network, the processor configured to receive a second set of side-channel data representing a power signature of a second target device and data being captured by a probe disposed proximate to the second target device, the processor configured to be operatively coupled to the second target device via the network, the processor configured to extract a first characteristic of the first set of side-channel data of the first target device and a second characteristic of the second set of side-channel data of the second target device, the processor configured to compare the first characteristic of the first target device with a power signature of a first reference device to determine a first anomaly of the first target device, the processor configured to compare the second characteristic of the second target device with a power signature of a second reference device to determine a second anomaly of the second target device, the processor configured to send a first signal indicating the first anomaly to the first target device and send a second signal indicating the second anomaly to the second target device.

16. The apparatus of claim 15, wherein the processor is configured to receive the first set of side-channel data from the first target device via an optical fiber.

17. The apparatus of claim 15, wherein:
the processor is configured to receive a plurality of electrical signal that represent the power signature of the first target device and that are received from an optical demodulator that converted the plurality of electrical signal from a plurality of optical signals received from an optical modulator that converted the plurality of optical signals from the first set of side-channel data.

18. The apparatus of claim 15, wherein the first set of side-channel data is converted to a plurality of optical signals by an optical modulator prior to being received at the processor, the optical modulator being external to the first target device.

19. The apparatus of claim 15, wherein the first set of side-channel data is converted to a plurality of optical signals by an optical modulator prior to being received at the processor, the optical modulator being integrated within the first target device.

20. The apparatus of claim 15, wherein the processor is physically remote from each of the first target device and the second target device.

* * * * *